US008482565B2

(12) United States Patent
Nachmanson

(10) Patent No.: US 8,482,565 B2
(45) Date of Patent: Jul. 9, 2013

(54) INTERACTIVE CONNECTOR ROUTING BETWEEN OBSTACLES

(75) Inventor: Lev Borisovich Nachmanson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 12/467,014

(22) Filed: May 15, 2009

(65) Prior Publication Data

US 2010/0289801 A1 Nov. 18, 2010

(51) Int. Cl.
*G06T 11/20* (2006.01)
(52) U.S. Cl.
USPC .......................................................... 345/441
(58) Field of Classification Search
USPC .......................................................... 345/441
See application file for complete search history.

(56) References Cited

U.S. PATENT DOCUMENTS

| | | | | |
|---|---|---|---|---|
| 5,740,341 | A * | 4/1998 | Oota et al. | 345/420 |
| 6,650,328 | B1 * | 11/2003 | Hobbs et al. | 345/442 |
| 7,444,269 | B2 * | 10/2008 | Drumheller | 703/1 |
| 7,518,606 | B2 * | 4/2009 | Connor et al. | 345/420 |
| 7,624,403 | B2 * | 11/2009 | Ishimitsu et al. | 719/328 |
| 2003/0101029 | A1 * | 5/2003 | Drumheller | 703/1 |
| 2004/0088670 | A1 | 5/2004 | Stevens | |
| 2006/0224304 | A1 | 10/2006 | Hudson, Jr. | |
| 2006/0271898 | A1 | 11/2006 | Kitamura | |
| 2009/0019453 | A1 * | 1/2009 | Kodaganur et al. | 719/312 |

OTHER PUBLICATIONS

Altium Designer—Altium Designer User Manual, Altium global headquarters: IBP Shanghai, Level 3—Building 3; No. 168; Linhong Road; Shanghai 200335, China; pp. 1-17 in the captured portions of the document, Oct. 2007.*
Dobkin, D. P., E. R. Gansner, E. Koutsofios, S. C. North, Implementing a general-purpose edge router, Proc. of the 5th Int'l Symposium on Graph Drawing, GD 1997, Sep. 18-20, 1997, pp. 262-271, Rome, Italy.
Priya, T. K., K. Sridharan, A parallel algorithm, architecture and FPGA realization for high speed determination of the complete visibility graph for convex objects, Microprocessors and Microsystems, Feb. 2006, pp. 1-14, vol. 30, No. 1.
Storer, J. A., J. H. Reif, Shortest paths in the plane with polygonal obstacles, J. ACM, Sep. 1994, pp. 982-1012, vol. 41, No. 5.

(Continued)

*Primary Examiner* — Edward Martello

(57) ABSTRACT

An interactive connector routing system and method for creating a connector between two shapes in a digital canvas or workspace that is based on a shortest path. The system and method avoid the use of a tangent visibility graph when possible to minimize computation time. When the graph is used, it is built one portion during pointing device events. Source and target ports are set and it is determined whether a valid simple path can be created between these ports. If no simple path exists, then the system and method build an extended tangent visibility graph during pointing devices events. Building the extended tangent visibility graph includes an iterative process that enlarges an active rectangle until it contains the necessary obstacles and shapes to generate the shortest valid path for the connector. The system and method also use finishing techniques to clean up and smooth the connector path.

20 Claims, 18 Drawing Sheets

OTHER PUBLICATIONS

Wagner, D. P., Path planning algorithms under the link-distance metric, Thesis, Feb. 2006, pp. 283, Dartmouth College, Hanover, New Hampshire.

Wybrow, M., K. Marriott, P. J. Stuckey, Incremental connector routing, 13th Int'l Symposium on Graph Drawing, GD 2005, Sep. 12-14, 2005, pp. 446-457, Limerick, Ireland.

Zhang, Z., Recognition and searching of one-sided rectilinear polygons, Jan. 2008, pp. 93, Masters of Science Thesis, University of Saskatchewan, Saskatoon.

Rohnert, H.; "Shortest paths in the plane with convex polygonal obstacles"; Information Processing Letters; vol. 23, No. 2; Aug. 20, 1986; pp. 71-76.

Ghosh, S.; "Visibility Algorithms in the Plane"; Cambridge University Press; Mar. 2007; pp. 31-38.

Nachmanson, L. et al.; "Drawing Graphs with GLEE"; Proceedings of the 15th International Conference on Graph Drawing; 2007; pp. 389-394.

* cited by examiner

INTERACTIVE CONNECTOR ROUTING BETWEEN OBSTACLES

BACKGROUND

Diagramming software is used to produce graphical diagrams on a digital workspace or canvas. Typically, there are shapes or objects in a workspace, and a user can choose to connect any two shapes with a connector. It is desirable for the connector to be as short as possible while avoiding other shapes (known as obstacles) that are not a source shape (where the connector begins) or a target shape (where the connector terminates). The process of finding the shortest path while avoiding the obstacles is known as routing the connector.

It is also desirable to have good visual feedback as the user is dragging the termination point of the connector as to where the final position of the connector will be located. Current applications do not perform this feedback very well because there is a lag in the visual feedback due to computations being performed by the system. By way of example, in some diagramming applications the connector will jump quite a bit while the use is dragging the connector.

In addition, often the shortest path between the source shape and target shape that avoids obstacles is not a smooth path. However, it is desirable for the user that the connector has a smooth path without sharp edges and abrupt turns. From an aesthetic standpoint, the connector that has a smooth or flowing path will look more pleasing to the user.

Moreover, a tangent visibility graph is often used to find the shortest path. However, a tangent visibility graph can be quite large and require extended computation times. For example, there might be $4n^2$ edges in the tangent visibility graph of n shapes. Even for a small n, to calculate the tangent visibility graph can take several seconds. For an interactive scenario, this is unacceptable, as there is a lag time between when the user moves the pointing device and when the user sees the visual feedback. This lag time makes users feel quite uncomfortable.

SUMMARY

This Summary is provided to introduce a selection of concepts in a simplified form that are further described below in the Detailed Description.

Embodiments of the interactive connector routing system and method include generating creating a connector between two shapes in a digital canvas or workspace that is based on the shortest path between the two shapes. When possible, the use of the tangent visibility graph is avoided in order to minimize computation time. When the tangent visibility graph does need to be employed, embodiments of the interactive connector routing system and method build the tangent visibility graph a portion at a time during the time when the user is dragging or moving the pointing device. Thus, during each pointing device event a small and necessary portion of the tangent visibility graph is calculated and built. In addition, this calculation is fast enough to give good visual feedback to the user.

Embodiments of the interactive connector routing system and method select two shapes to connect from a plurality of shapes in the digital canvas or workplace. Before connector routing for each shape, embodiments of the system and method create two convex polygons or obstacles. The first polygon contains (or circumscribes) the shape and is called a tight obstacle. The second polygon contains (or circumscribes) the tight obstacle and is called a loose obstacle. The shape where the connector begins is called the source shape, and the shape where the connector terminates is called the target shape.

The loose and tight obstacles aid in the routing of the connector around the obstacles. In particular, the connector is allowed to intersect a loose obstacle, but it cannot intersect a tight obstacle. In this manner, the tight obstacle ensures that the shortest path, when smoothed, does not intersect shapes which are not the source and the target shapes. The calculation of the loose and tight obstacles does not take much time or computing power, so this is performed when the user first starts dragging the pointing device.

Embodiments of the interactive connector routing system and method then set a source port, which is the starting point for the connector. When the dragging of the pointing device begins, the source port needs to be inside of one of the loose obstacles. If the cursor of the pointing device is inside the loose obstacle of the source shape, then a source port is created. If the cursor is inside of the tight obstacle of the source shape and far away from the boundary curve of the source shape, then the source port is a floating port. If the cursor is inside of the tight obstacle and close enough to the shape boundary, or if the cursor is outside of the tight obstacle but inside of the loose obstacle, then the source port is snapped to the boundary of the source shape and is called a boundary port.

Embodiments of the interactive connector routing system and method then set the target port. The same rule of the port selection is applied to the target port. Embodiments of the interactive connector routing system and method then check to see whether a simple path can be created for the connector, in order to avoid creating a tangent visibility graph. Embodiments of the system and method determine whether obstacles can be avoided and a valid path created by using a straight line segment or a series of up to three line segments.

In the situation where no simple path will create a valid path for the connector, then embodiments of the interactive connector routing system and method build a tangent visibility graph. The most complex case for a simple path is the situation where the simple path consists of three straight segments. Building a tangent visibility graph includes discovering polygons that need to be included in the tangent visibility graph construction. This is described by extending the tangent visibility graph to an active rectangle, which originally contained only the source port. The active rectangle is enlarged until. It contains both the source and target ports. An iterative process then is used to continue growing the active rectangle until it contains the necessary obstacles and polygons to generate the shortest valid path for the connector. Once the shortest valid path is computed, it typically will not be smooth or aesthetically pleasing. Therefore, embodiments of the interactive connector routing system and method use finishing techniques to clean up and smooth the connector path.

As noted above, existing techniques that build a tangent visibility graph create at most 2n (n−1) edges, where n is the number of shapes for which the graph is built. However, embodiments of the interactive connector routing system take less computation time because at each pointing device event embodiments of the system build only a small portion of this graph.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout, FIG. 1 illustrates sets of tight obstacles and loose obstacles for three shapes of different shapes.

DETAILED DESCRIPTION

In the following description of embodiments of the interactive connector routing system and method reference is made to the accompanying drawings, which form a part thereof, and in which is shown by way of illustration a specific example whereby embodiments of the interactive connector routing system and method may be practiced. It is to be understood that other embodiments may be utilized and structural changes may be made without departing from the scope of the claimed subject matter.

I. Definitions

Preparatory to discussing embodiments of the interactive connector routing system and method, it is instructive to formally define terms that will be used throughout the remainder of this document.

I.A. Obstacles and Related Constructions

Let C be a set of closed curves on a plane representing a set of obstacles, or boundaries of shapes. Assume that the shapes are mutually disjoint, meaning that they have no common elements. Although some embodiments of the interactive connector routing system and method can handle cases where shapes may intersect each other, for simplicity this discussion will be restricted to the case of mutually disjoint shapes.

For each curve c in C a convex polygon $T^c$ is built containing c in such a way that the collection $T=\{T^c: c \text{ in } C\}$ is mutually disjoint. Further, for each polygon $P=T^c$ in T, a convex polygon $L^c$ is constructed such that P is contained in $L^c$ and the collection $L=\{L^c: c \text{ in } C\}$ is still mutually disjoint.

Embodiments of the interactive connector routing system and method call the collection T by set of tight obstacles and call the collection L by set of loose obstacles. Loose obstacles are used for routing a shortest path and tight obstacles are used for avoiding original shapes when smoothing the path and providing the padding to the shapes.

Figure 1:
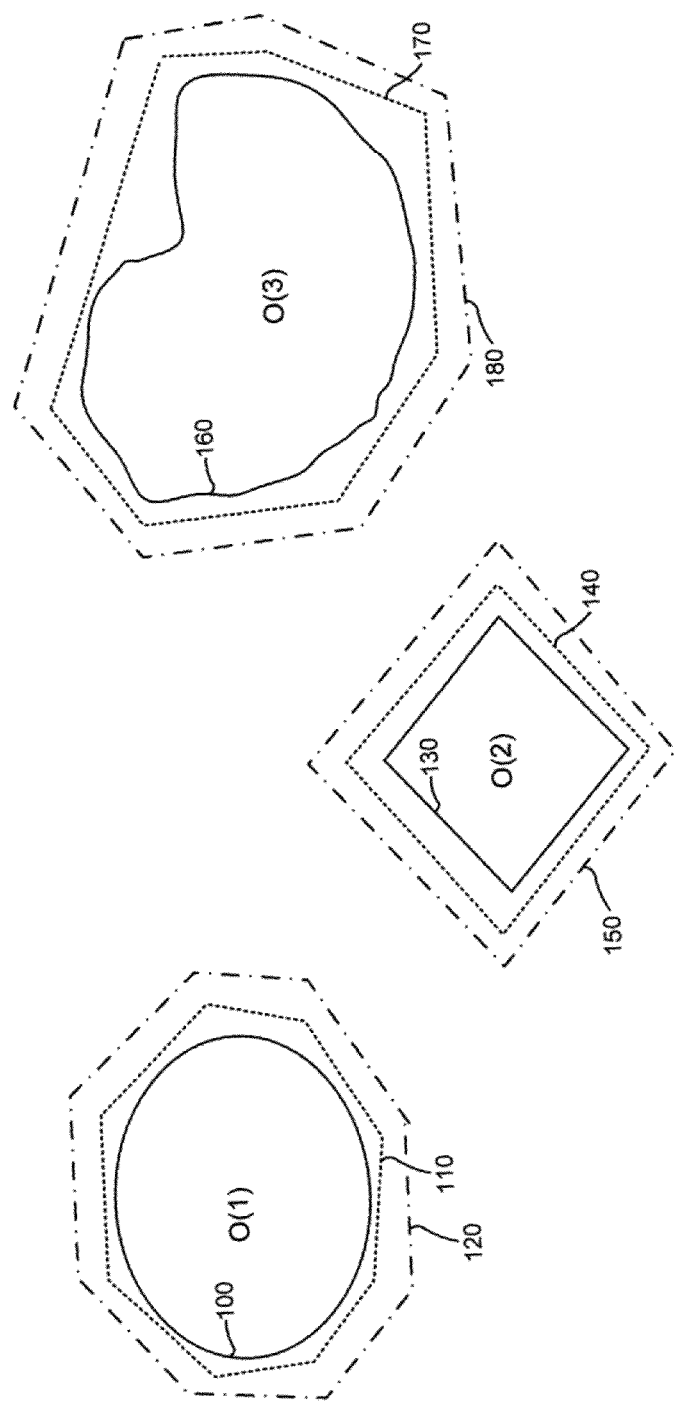

FIG. 1 illustrates sets of tight obstacles and loose obstacles for three shapes of different shapes. In particular, O(1) is a first shape containing a first curve 100, shown as a solid line. A tight obstacle 110 for O(1) is shown as the dotted line around the first curve 100. A loose obstacle 120 for O(1) is shown as a dashed-doted line around the first curve 100. Similarly. O(2) is a second shape containing a second curve 130, shown as a solid line, a tight obstacle 140 shown as a dotted line around O(2), and a loose obstacle 150 shown as a dashed-dotted line around O(2). Moreover, O(3) is a third shape contained a third curve 160, shown as a solid line, a tight obstacle 170 shown as a dotted line around O(3), and a loose obstacle 180 shown as a dashed-dotted line around O(3).

I.B. Boundary Smoothness

Embodiments of the interactive connector routing system and method define at each point left and right tangents contained on each curve of C. One example of such a curve is a poly-line or a connected sequence of Bezier segments. It should be note that Bezier curves are widely used in computer graphics to model smooth curves.

Figure 2:
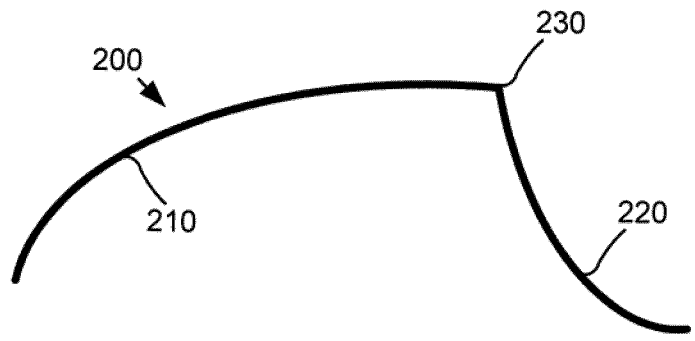
FIG. 2 is a diagram illustrating the concept of smoothness.

FIG. 2 is a diagram illustrating the concept of smoothness. A curve 200 is made up of a first segment 210 and a second segment 220. The curve is smooth if for each pair of consecutive segments 210, 220, tangents at the common ends 230 (or the point at which the segments 210, 220 meet) are parallel. As can be seen from FIG. 2, the tangents at the common ends 230 are not parallel. Therefore, the curve 200 is not smooth.

I.C. Ports

Figure 3:
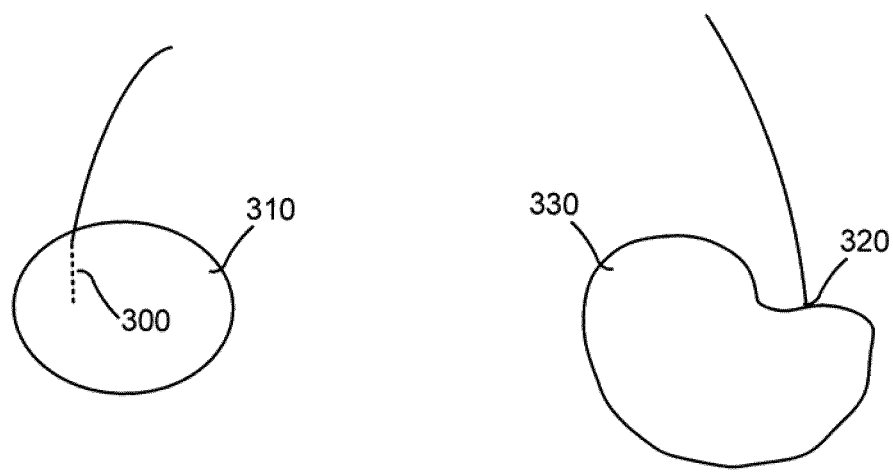
FIG. 3 illustrates a floating port and a boundary port as defined by embodiments of the interactive connector routing system and method.

A port defines how a connector attaches to a shape. Embodiments of the interactive connector routing system and method use two types of ports: floating and boundary ports. FIG. 3 illustrates a floating port and a boundary port as defined by embodiments of the interactive connector routing system and method.

In general, a floating port is a port that is not on or near a boundary of the shape. More specifically, a floating port is defined in one of two ways. First, a floating port can be defined by curve c from C and point p inside of c. This point is called the port location. The intention here is that a connector is routed to the port location and trimmed by curve c. Such a port is denoted by F(c,p). Second, a floating port may be defined by a point p lying outside of a union of polygons from L. This type of port is denoted by F(p). Referring to FIG. 3, a floating port 300 is shown. The dots inside a first shape 310 indicate that the floating port 300 may be located at any one of those dots.

In general, a boundary port is a port corresponding to a point on a boundary of a shape. Specifically, a boundary port is defined by curve c from C and a real number, which is a parameter, t from the curve domain. The intention here is that a connector is routed to point c(t) orthogonally to c. Such a port is denoted by B(c,t). Thus for each port has associated properties port.Curve and port.Location defined. It should be noted that the property port.Curve is null when port is equal to F(p) for some point p. Referring to FIG. 3, a boundary port 320 is shown at an intersection of a connector and a boundary of a second shape 330.

I.D. Associated a Port with a Point on the Plane

Let p be a point on the plane. If p lies outside any polygon of L then the port F(p) is associated with the point p. If p belongs to $L^c$ for curve c in C, then there are two cases possible depending on p and some real number d (which is given in advance).

First, if p is outside of c or the distance between p and c is less than d, then p is associated with boundary port B(c,t), where t is such that the point c(t) is a point closest to p on c. Otherwise, second, p is associated with port F(c,p). Moreover, the port associated with p is denoted by Port(p).

I.E. Taking a Boundary Port Out of its Loose Obstacle

Figure 4:
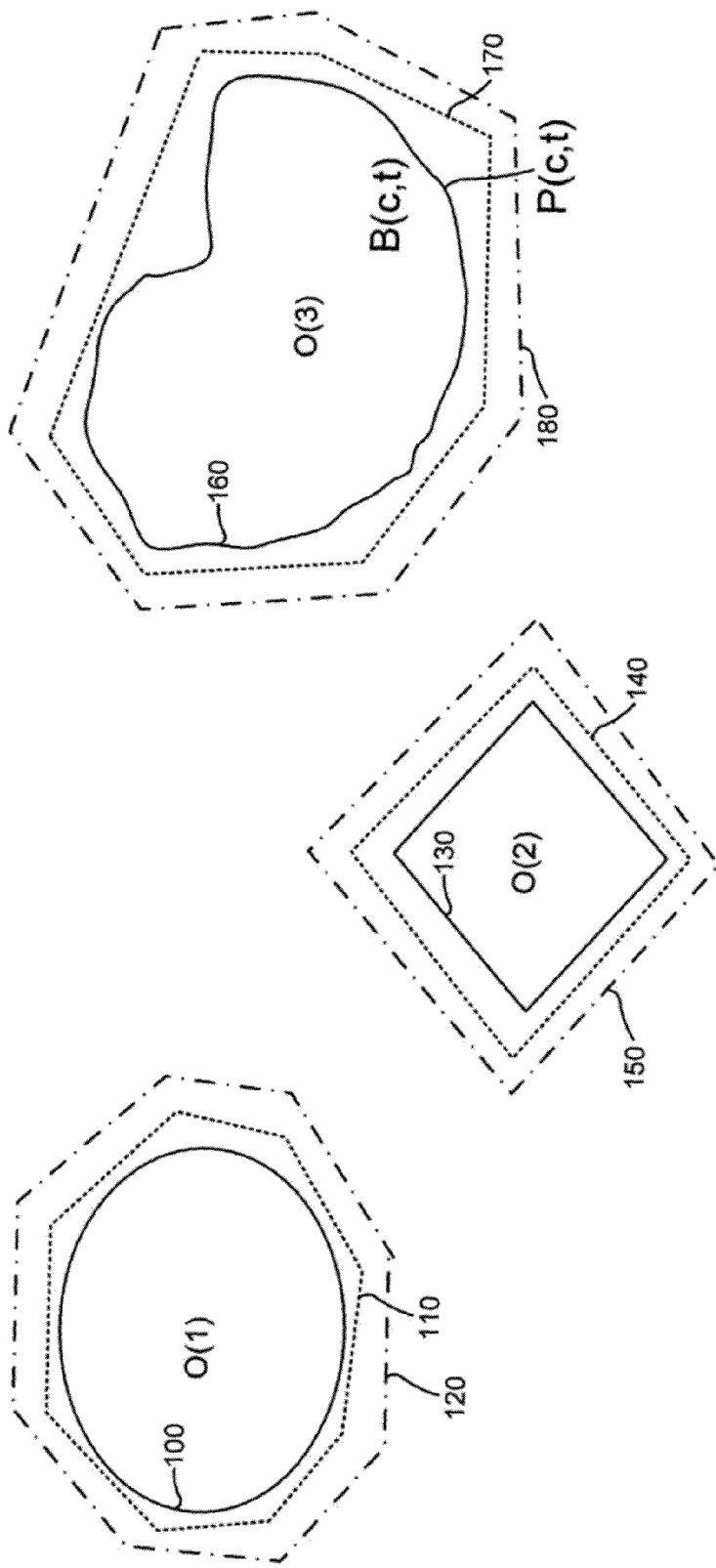
FIG. 4 illustrates the process of taking a boundary port out of its loose obstacle.

FIG. 4 illustrates the process of taking a boundary port out of its loose obstacle. Let B(c,t) be a boundary port. Referring to shape (or polygon) O(3), a point p is denoted by P(c,t) such that the following is true. First, the vector (c(t),p) is parallel to $n_c(t)$. Second, the distance between c(t) and p is not greater than the doubled distance from c(t) to $L^c$. Third, p is outside of any polygon from L. Note that P(c,t) is not a unique point and that embodiments of the embodiments of the interactive connector routing system and method include a procedure for picking one of such points, I.F. Tangent Visibility Graph For a set of mutually disjoint polygons a tangent visibility graph G is a graph that includes free supporting segments between the polygon vertices. A tangent visibility graph is well known to those having ordinary skill in the computer arts.

II. System Overview

Figure 5:
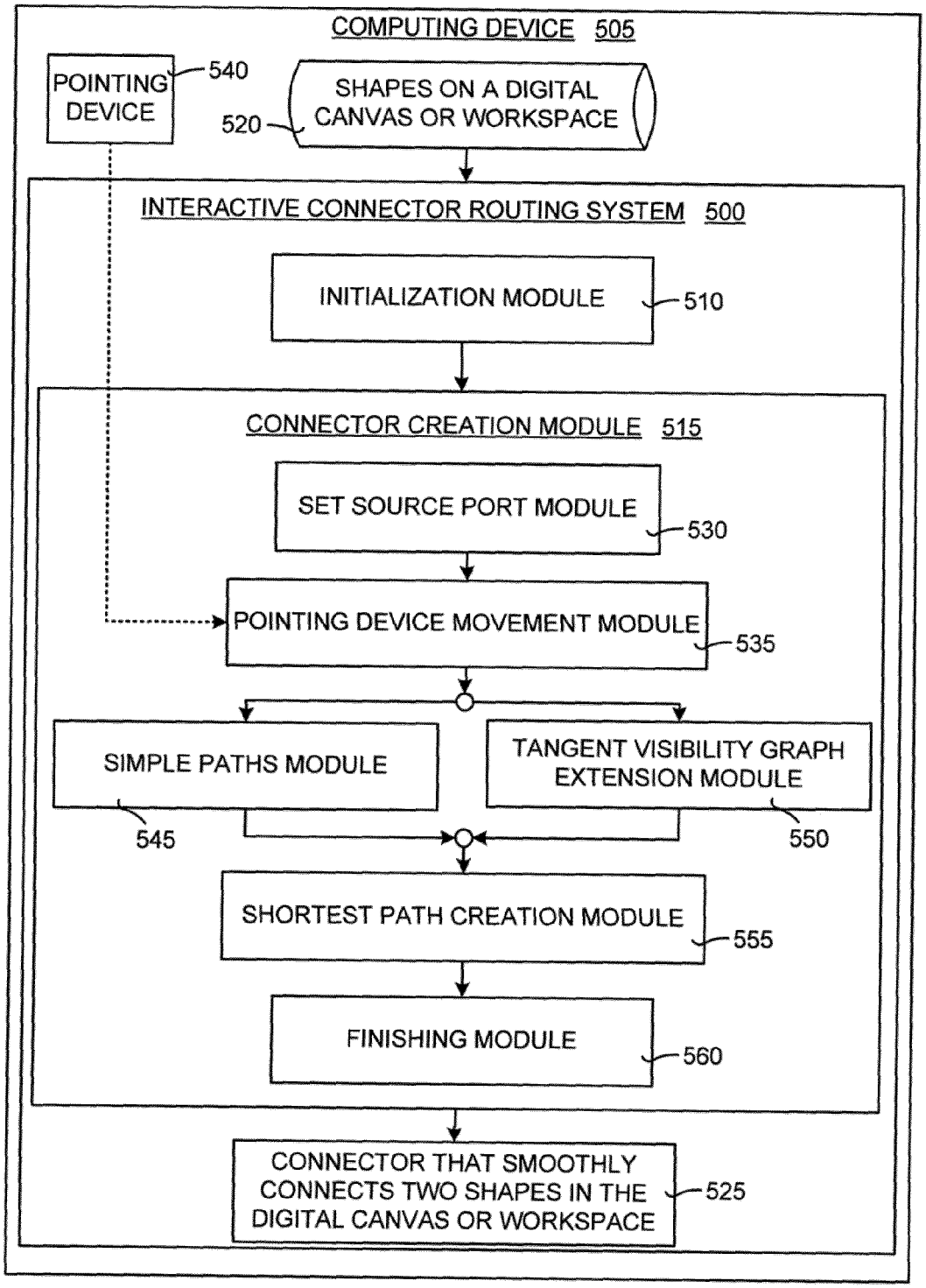
FIG. 5 is a block diagram illustrating a general overview of embodiments of the interactive connector routing system and method disclosed herein.

FIG. 5 is a block diagram illustrating a general overview of embodiments of the interactive connector routing system and method disclosed herein. It should be noted that the implementation shown in FIG. 5 is one of many implementations that are possible. Referring to FIG. 5, an interactive connector routing system 500 is shown implemented on a computing device 505. It should be noted that the computing device 505 may include a single processor (such as a desktop or laptop computer) or several processors and computers connected (either physically or wirelessly) to each other.

In general, embodiments of the interactive connector routing system 500 creates a connector that is a smooth curve that does not overlap the shapes on a canvas that are not the connector's source and target shapes. Embodiments of the interactive connector routing system 500 include an initialization module 510 and a connector creation module 515.

Embodiments of the interactive connector routing system 500 take as input objects or shapes in a digital canvas or workspace 520. The objects or shapes on the digital canvas or workspace 520 are used by embodiments of the interactive connector routing system 500 to create a connector 525 that connects two shapes in the digital canvas. The initialization module 510 performs preliminary calculations to prepare the interactive connector routing system 500 to create the connector 525.

The connector creation module 515 includes many modules that aid in the construction of the connector 525. In particular, a set source port module 530 identifies the source port for the connector that is to be created. A pointing device movement module 535 is called on each move of a point device 540 to perform actions to create the connector 525.

The pointing device movement module 535 makes use of a simple paths module 545 and a tangent visibility graph extension module 550. The simple paths module 545 determines whether simpler paths would work when generating the connector 525. This module 545 is called before using the tangent visibility graph. The tangent visibility graph extension module 550 prepares a tangent visibility graph that is large enough to contain a shortest path between a starting point and a termination point of the connector 525.

The connector creation module 515 also includes a shortest path creation module 555. This module 555 computes a shortest path between the starting point and the termination point in the tangent visibility graph. Once the shortest path is created, a finishing module 560 is used. The finishing module 560 uses a variety of techniques to increase the aesthetic appeal of the connector 525. The output of the interactive connector routing system 500 is the connector 525 that smoothly connects the two shapes while avoiding any obstacles.

III. Operational Overview

Figure 6:
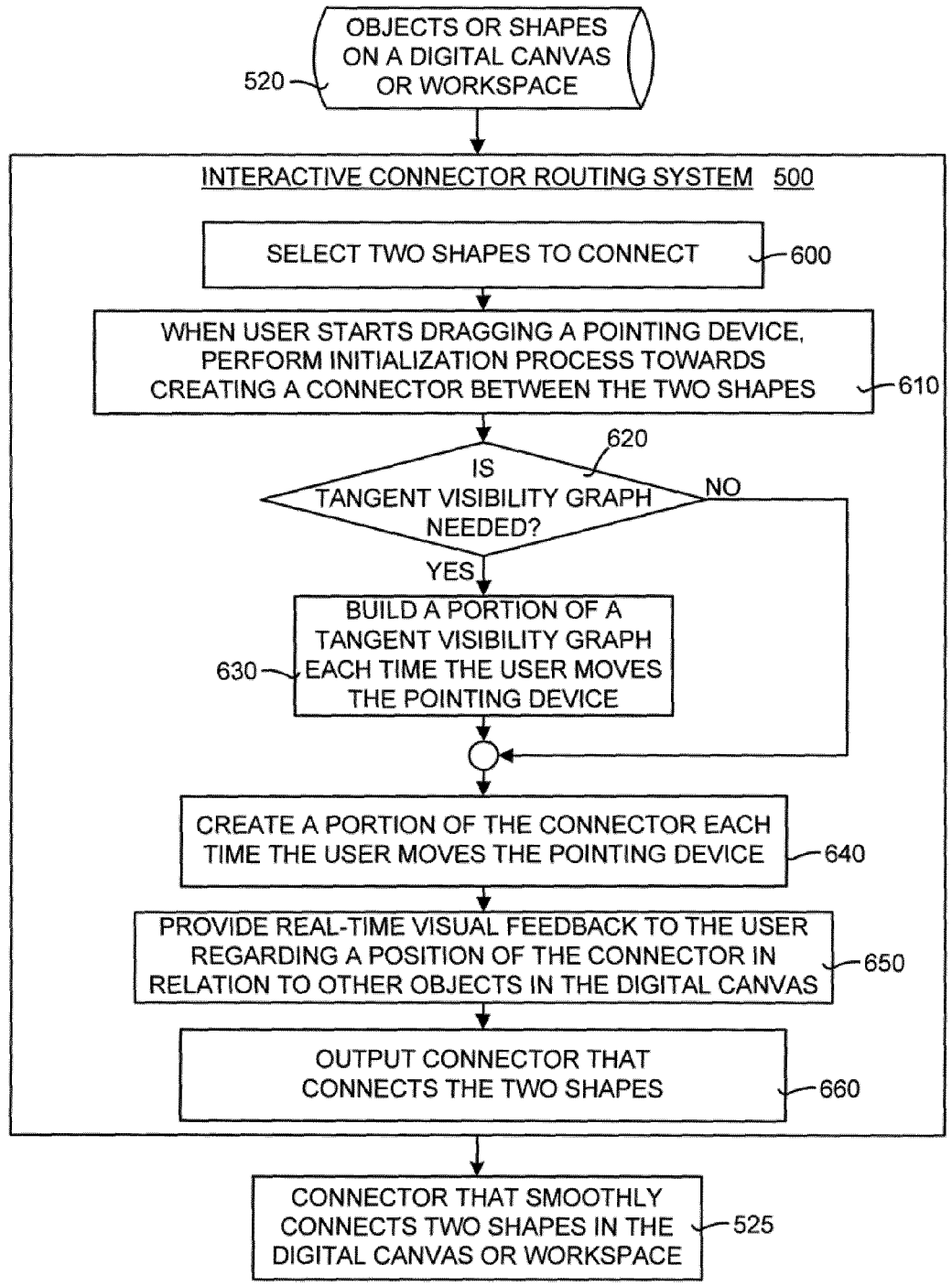
FIG. 6 is a general flow diagram illustrating the operation of embodiments of the interactive connector routing system and method shown in FIG. 5.

FIG. 6 is a general flow diagram illustrating the operation of embodiments of the interactive connector routing system 500 and method shown in FIG. 5. In general, the method generates a connector 525 as a smooth curve that does not overlap or intersect objects or shapes of the digital canvas that are not the connector's source and target shapes. The method changes the connector style dynamically when the target port moves from a shape boundary to its interior. Embodiments of the interactive connector routing method are directed to a scenario where the positions of the connector ports (which are points where the connector attaches to shapes) are not fixed. Instead, a user is allowed to choose the ports anywhere on a shape. Embodiments of the interactive connector routing method enable quick calculation of the connector for intermediate target ort positions, thus providing the user with insight on the connector's final curve.

Referring to FIG. 6, the method begins by inputting the objects or shapes that are contained on a digital canvas or workspace 520. From these objects or shapes that are contained on a digital canvas or workspace 520, two shapes are selected that will be connected by a connector (box 600). One of the two shapes containing the starting port is called the source shape, while the other shape containing the termination port is called the target shape.

As a user begins dragging a pointing device (such as a mouse), the method performs an initialization process that begins the process of creating the connector between the source and target shapes (box 610). This initialization process is described in further detail below. A determination then is made as to whether a tangent visibility graph is needed to create the connector (box 620). As explained below, there are situations where the connector can be created without the need for the tangent visibility graph. This is desirable because the creation of the tangent visibility graph consumes precious system resources.

If a tangent visibility graph is needed, then the method build a portion of the tangent visibility graph each time the user moves the pointing device (box 630). This means that the tangent visibility graph is created small portions at a time, until the entire tangent visibility graph is created. In other words, for each pointing device event a small portion of the tangent visibility graph is created.

Regardless of whether the tangent visibility graph is needed, the method then creates a portion of the connector each time the user moves the pointing device (box 640). As with building the tangent visibility graph, at each pointing device event or movement another portion of the connector is created or a further calculation towards the creation of the connector is computed. As the connector is being constructed, the method provides real-time visual feedback to the user so that the user can determine a position of the connector in relation to other shapes in the digital canvas or workspace (box 650). The connector that connects the two shapes then is output from the system 500 (box 660). This output is the connector 525 that smoothly connects the two shapes (source shape and target shape).

Figure 7:
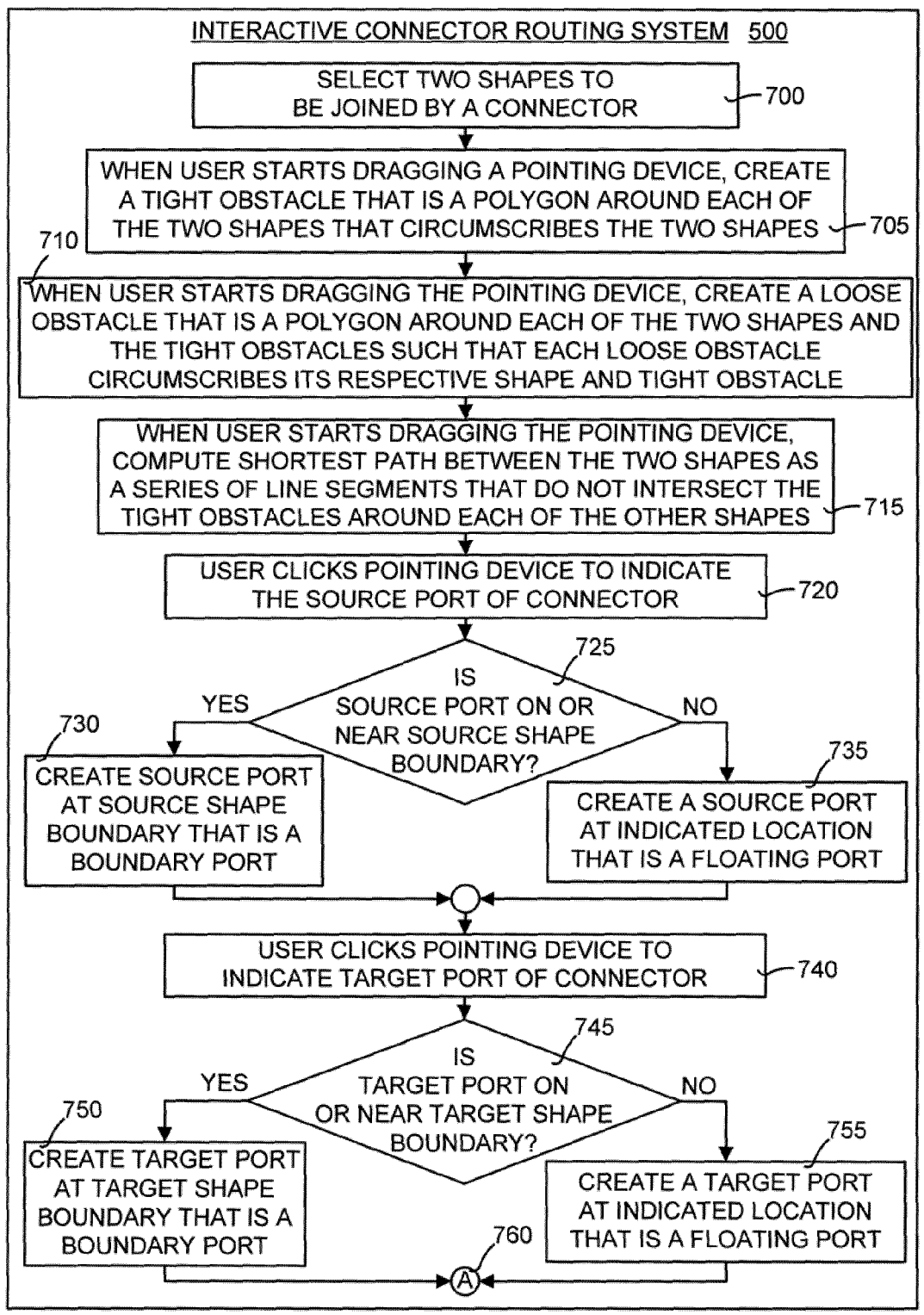
FIG. 7 is a detailed flow diagram that illustrates more of the details of the operation of embodiments of the interactive connector routing system and method shown in FIGS. 5 and 6.

FIG. 7 is a detailed flow diagram that illustrates more of the details of the operation of embodiments of the interactive connector routing system 500 and method shown in FIGS. 5 and 6. The method selects two shapes to be joined by a connector (box 700). When the user begins dragging a pointing device, a tight obstacle is created around each shape (box 705). This tight obstacle is a polygon that is around a shape that circumscribes the shape. Similarly, when the user begins dragging the pointing device, a loose obstacle is created around each shape (box 710). This loose obstacle is a polygon that is around a shape such that the loose obstacle circumscribes its respective shape and the associated tight obstacle.

When the user starts dragging the pointing device, the method begins computing a shortest path between the source shape and the target shape (box 715). This shortest path is a one line segment or a series of line segments that do not intersect the tight obstacles surrounding the other shapes (or obstacles). The user then clicks the pointing device at a location on the digital canvas or workspace to indicate the starting port of the connector (box 720).

A determination then is made as to whether the source port is on or near the boundary of the source shape (box 725). If so, then the source port is a boundary port and is created at the boundary of the source shape at the location indicated by the user (box 730). If not, then this means that the source port is inside the source shape. In this case, the source port is a floating port and is created at the location inside the source shape as indicated by the user (box 735).

The user then clicks the pointing device to indicate on the digital canvas or workspace a target port of the connector (box 740). A determination then (is made as to whether the target port is on or near a boundary of the target shape (box 745). If so, then the target port is a boundary port and is created at the boundary of the target shape at the location indicated by the user (box 750). If not, then the target port is inside the target shape. This means that the target port is a floating port and is created at the location inside the target shape as indicated by the user (box 755). A junction "4" 760 inside a circle is used to indicate that the flow chart is continued on another page.

Figure 8:
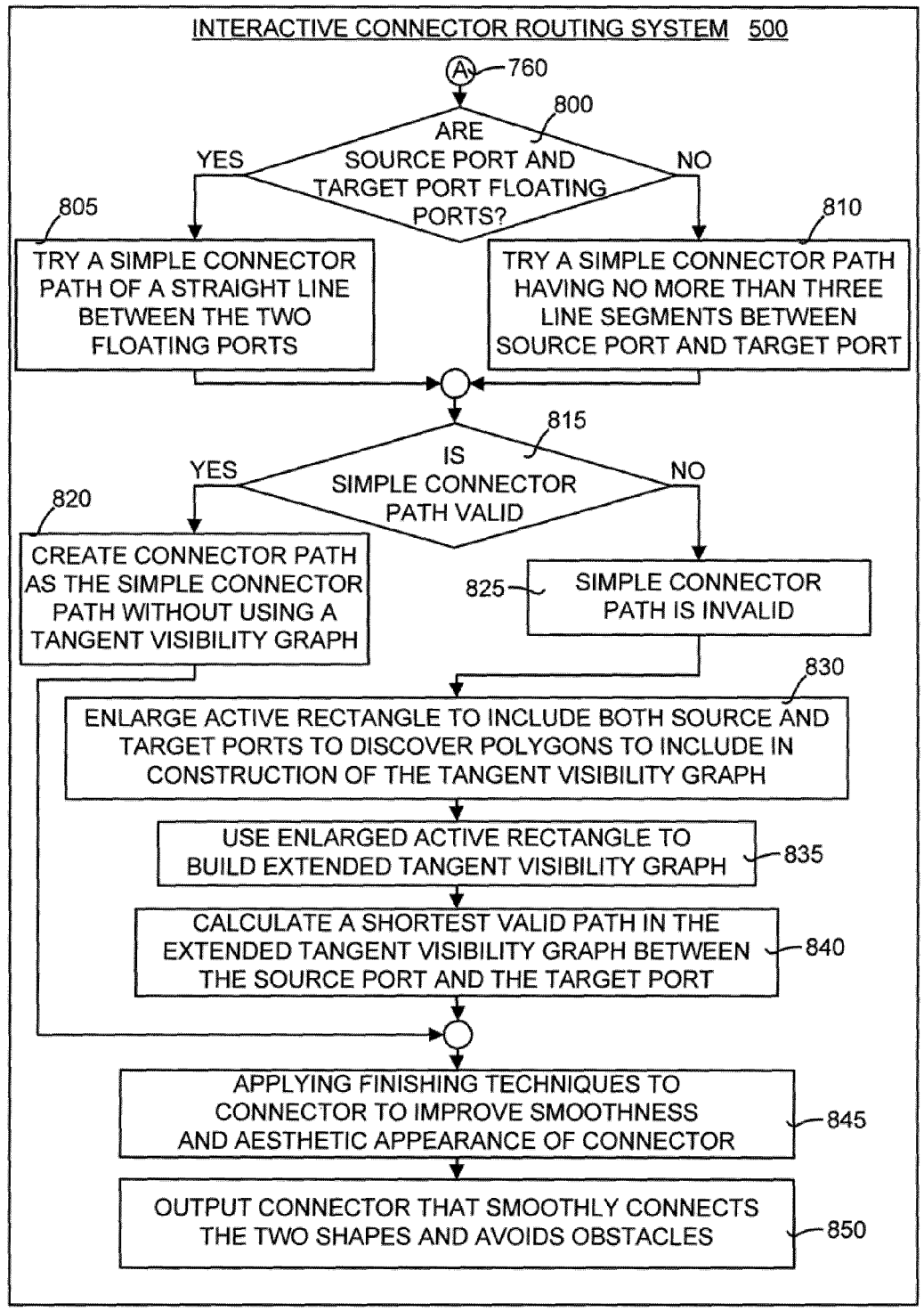
FIG. 8 is a detailed flow diagram that is a continuation of the process shown in FIG. 7.

In particular, FIG. 8 is a detailed flow diagram that is a continuation of the process shown in FIG. 7. FIG. 8 picks up at the location (junction "A" 760) where FIG. 7 left off. In particular, the method then makes a determination as to whether both the source port and the target port are floating ports (box 800). If so, then the method tries a simple connector path of a straight line between the two floating ports (box 805). If not, then the method tries a simple connector path having no more than a series of three line segments between the source port and the target port (box 810).

The simple paths for the connector is attempted first in order to avoid having to build the tangent visibility graph. A determination then is made as to whether the simple connector path is valid (box 815). If so, then the simple connector path is used as the path for the connector, without having to build the tangent visibility graph (box 820). Otherwise, the simple connector path is invalid (box 825). As explained in detail below, a path may be invalid because the path intersects the tight obstacle of an obstacle.

If the simple connector path is invalid, then a tangent visibility graph is built. This is achieved by enlarging an active rectangle that initially includes just the source port to also include the target port (box 830). This process discovers polygons in the digital canvas or workspace to include in the construction of the tangent visibility graph. The enlarged active rectangle then is used to build an extended tangent visibility graph (box 835). Next, the method calculates a shortest valid path in the extended tangent visibility graph between the source port and the target port (box 840).

Irrespective of whether the connect path was constructed without using the tangent visibility graph or with it, the method then applies finishing techniques to the connector (box 845). These techniques, which are described in detail below, improve the smoothness and aesthetic appearance of the connector. The output of the method is the connector that smoothly connects the source and target shapes while avoiding obstacles (box 850).

IV. Operational Details

The operational details of embodiments of the interactive connector routing system 500 and method now will be discussed. Embodiments of the interactive connector routing system 500 and method include several program modules, as shown in FIG. 5. The operational details of each of these programs modules now will be discussed in detail.

IV.A. Initialization Module

Figure 9:
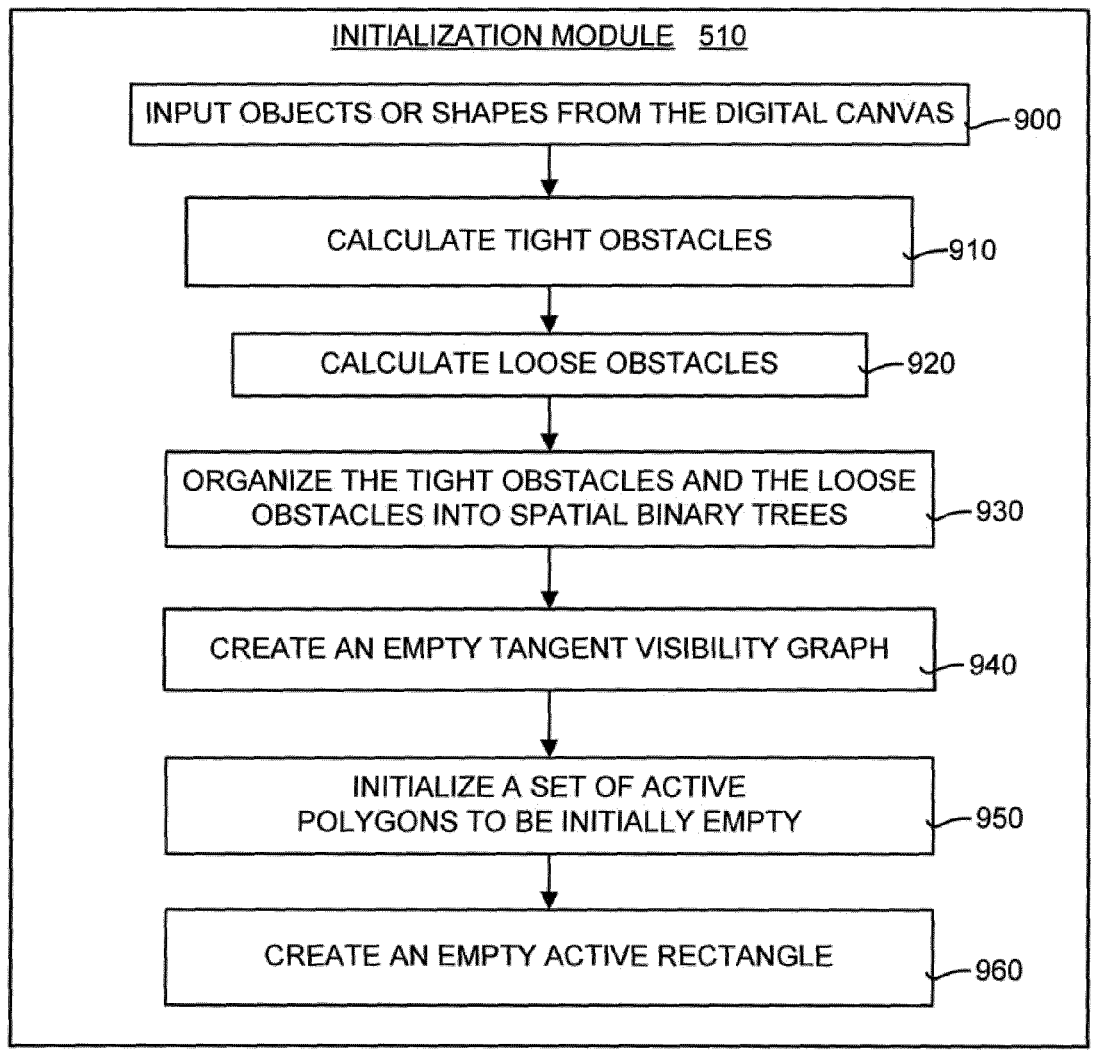
FIG. 9 is a detailed flow diagram illustrating the operation of embodiments of the initialization module shown in FIG. 5.

FIG. 9 is a detailed flow diagram illustrating the operation of embodiments of the initialization module 510 shown in FIG. 5. The initialization module 510 begins by inputting objects or shapes from the digital canvas (box 900). Next, the module 510 calculates a tight set of obstacles, T (box 910) and a loose set of obstacles, L (box 920). The module 510 also organizes T and L into spatial binary trees for fast hit detection (box 930). In addition, the initialization module 510 creates an empty tangent visibility graph, G (box 940). A set of active polygons, A, is initialized to be initially empty (box 950), and the module 510 creates an empty active rectangle R (box 960).

IV.B. Connector Creation Module

In general, embodiments of the connector creation module 515 create a connector when a user interacts with a pointing device (such as a mouse device) by clicking one of the buttons on the pointing device (such as the left mouse button). The user then drags the connector while depressing the button, and releases the button at the desired point. The following discussion concerns the creation of the connector while the user is depressing the button of the pointing device.

IV.B.1. Set Source Port Module

Embodiments of the set source port module 530 shown in FIG. 5 are used to set the source port while the pointing device button is depressed. In some embodiments, this module 530 is called when the user clicks the left button of a mouse device. Assume for simplicity that the source port has a curve associated with it, or in another words that the user always attaches a connector start to a shape.

Figure 10:
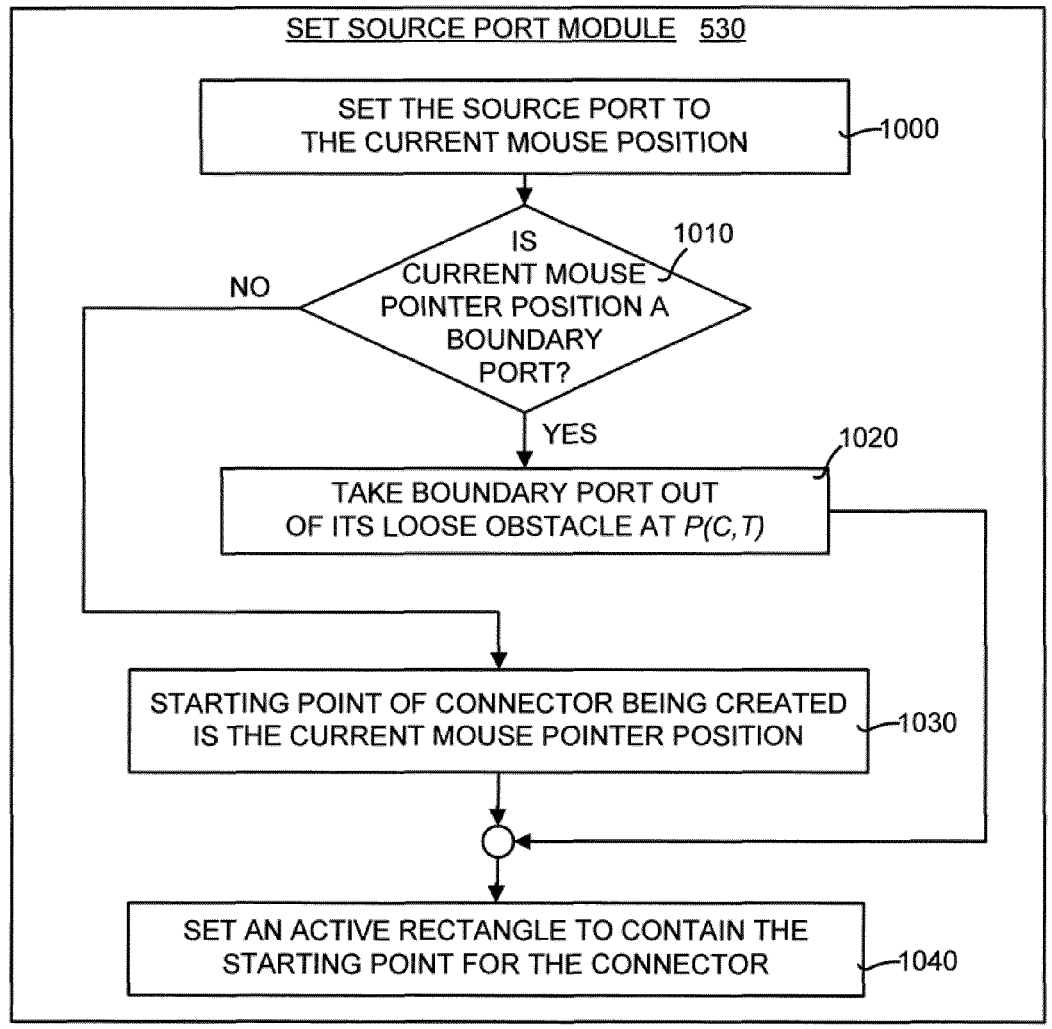
FIG. 10 is a detailed flow diagram illustrating the operation of embodiments of the set source port module shown in FIG. 5.

FIG. 10 is a detailed flow diagram illustrating the operation of embodiments of the set source port module 530 shown in FIG. 5. The set source port module 530 begins by setting the source port to the current mouse pointer position when the user clicks a pointing device (box 1000). A determination then is made as to whether the current mouse pointer position is a boundary port (box 1010). In other words, the module determines whether the source port on or near the boundary of the source shape. If the current mouse pointer position is a boundary port, B(c,t), then the module 530 takes the boundary point out of its loose obstacle at P(c,t) (box 1020). This means that the start of the connector being created begins at P(c,t). If the current mouse pointer position is not a boundary port, then the start of the connector being created begins at the current mouse point position (box 1030). Moreover, an active rectangle is set to contain just the starting point (or source port) for the connector being generated (box 1040).

IV.B.2. Pointing Device Movement Module

Figure 11:
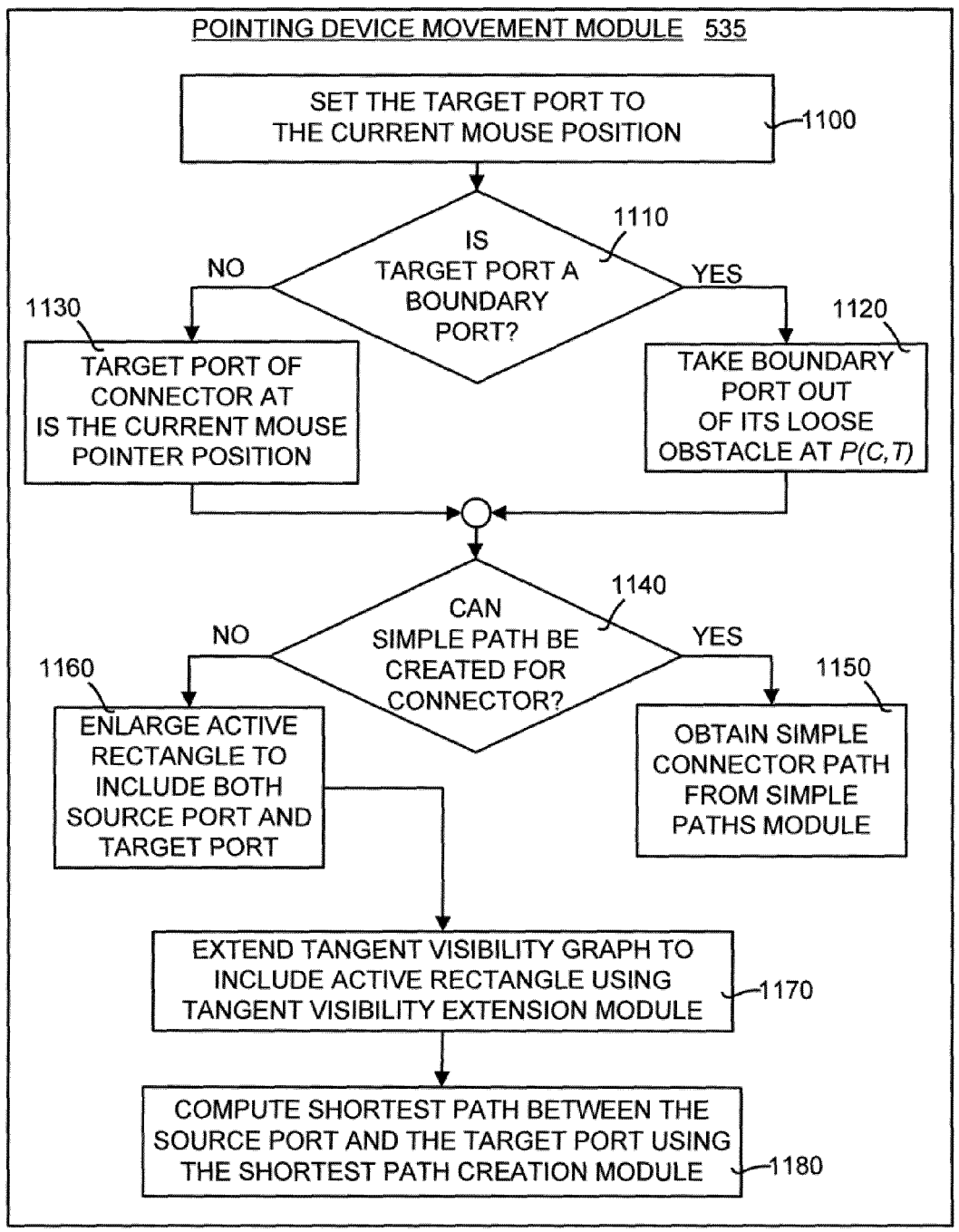
FIG. 11 is a detailed flow diagram illustrating the operation of embodiments of the pointing device movement module shown in FIG. 5.

Embodiments of the pointing device movement module 535 are active on each move of the pointing device. FIG. 11 is a detailed flow diagram illustrating the operation of embodiments of the pointing device movement module 535 shown in FIG. 5.

This module 535 begins by setting a target port to the current mouse pointer position (box 1100). In addition, a target curve is set to a curve on which the current mouse pointer position is located. A determination then is made as to whether the target port is a boundary port, B(c,t) (box 1110). If so, then the target port of the connector under construction is at P(c,t) (box 1120). Otherwise, the target port is at the current mouse pointer position (box 1130).

A determination then is made as to whether a simple path for the connector can be created (box 1140). This determination is made by the simple paths module, which is described in detail below. If a simpler path can be generated, then this simpler path is returned from the simple paths module (box 1150). Otherwise, an active rectangle, R, is enlarged to include the termination point of the connector (box 1160). Moreover, a tangent visibility graph is extended to include the active rectangle by a tangent visibility graph extension module (box 1170), which is described in detail below. A shortest path creation module then is used to calculate a shortest path between the source port and the target port (box 1180). The details of the shortest path creation module are described in detail below.

IV.B.3. Simple Paths Module

Embodiments of the simple paths module 545 are called when a determination needs to be made as to whether there are simple paths that a connector can take between two endpoints. In particular, before using a tangent visibility graph to find a path, the simple paths module 545 attempts a straight line between two floating port locations. In addition, the module 545 tries paths that include a series of two or three segments when boundary ports are present. For the case of a boundary port, B(c,t), the module 545 desires that for some given in advance angle, α, between 0 and π/2, the segment of a simple path touching the port location is contained in an α-cone around vector n(c,t).

Figure 12:
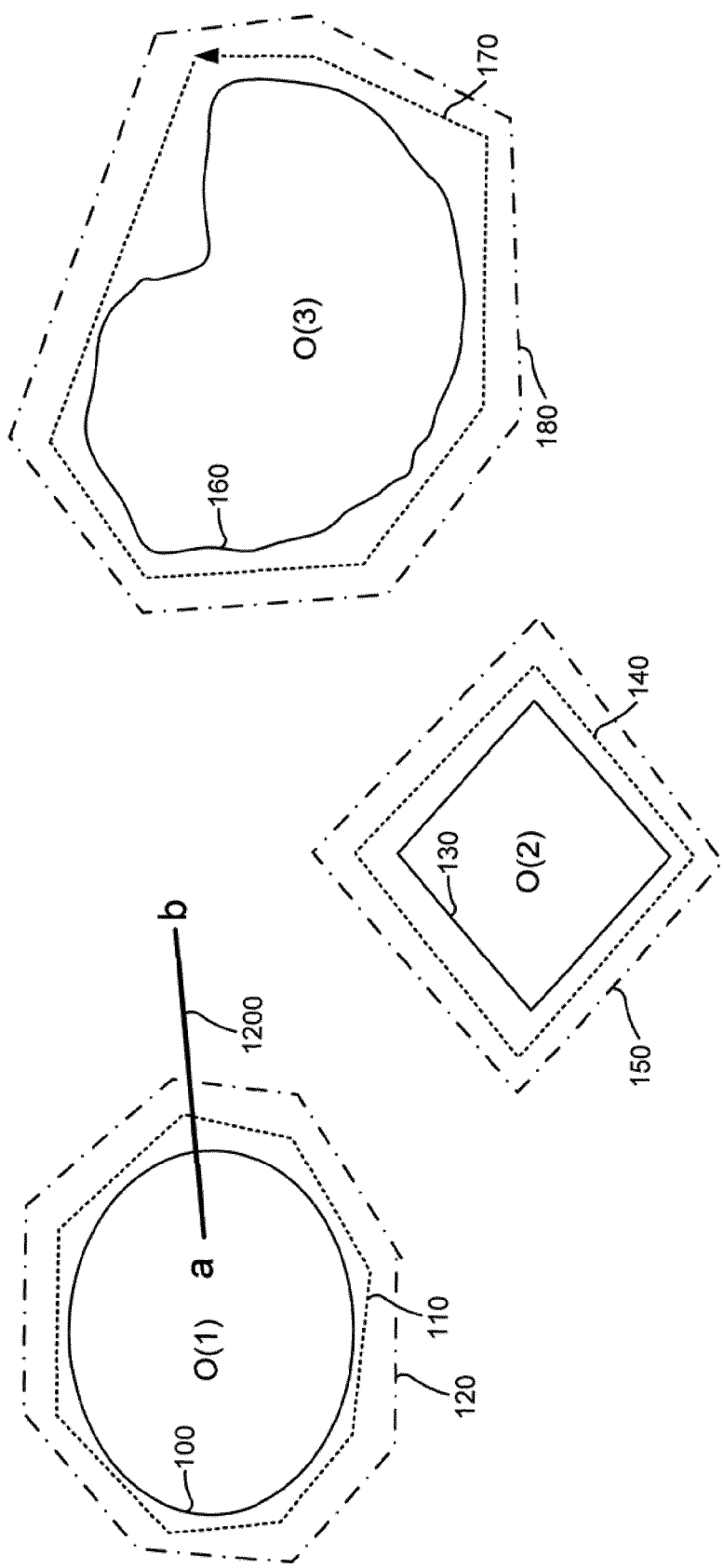
FIG. 12 illustrates a first example of a legal simple paths procedure.

FIGS. 12-15 are examples that demonstrate different cases arising when using embodiments of the simple paths module 545. FIG. 12 illustrates a first example of a legal simple paths procedure. As shown in FIG. 12, a path 1200 between point a (within O(1)) and point b (near O(1)) is a legal path, and the simple paths module 545 returns a "true" or "valid" statement. It should be noted that both point a and point b are floating ports.

Figure 13:
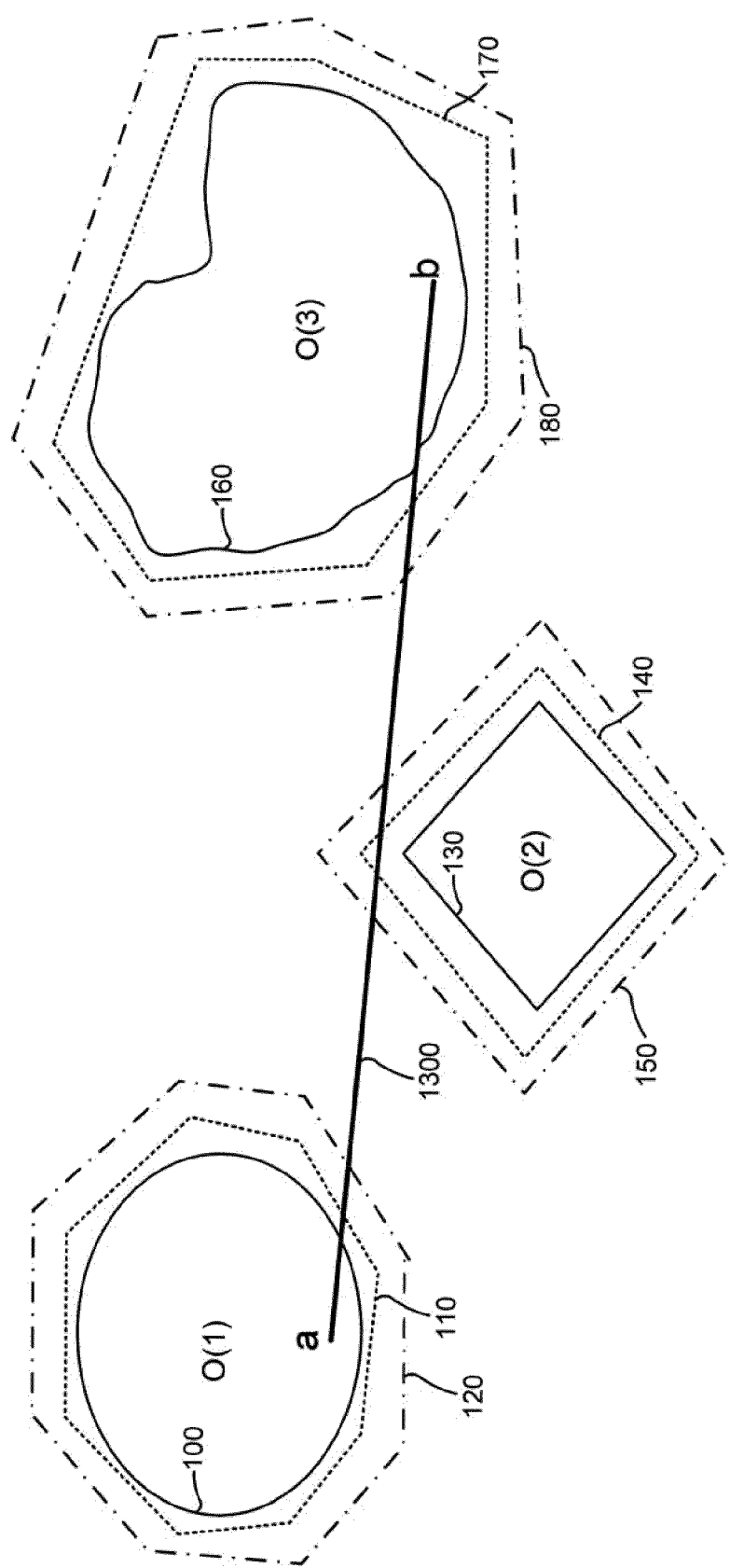
FIG. 13 illustrates a first example of an illegal simple paths procedure.

FIG. 13 illustrates a first example of an illegal simple paths procedure. As shown in FIG. 13, a path 1300 between floating point a (within O(i)) and floating point b (within O(3)) is an illegal path, since the path 1300 intersects a tight obstacle T that does not correspond to the source shape (O(1)) or the target shape (O(3)). It should be noted that both point a and point b are floating ports.

Specifically, the path 1300 intersects the tight obstacle 140 shown as a dotted line around O(2). Note that the tight obstacle 140 of O(2) does not correspond to the source shape O(1) or the target shape O(3). In this case, the simple paths module 545 returns a "false" or an "invalid" statement.

Figure 14:
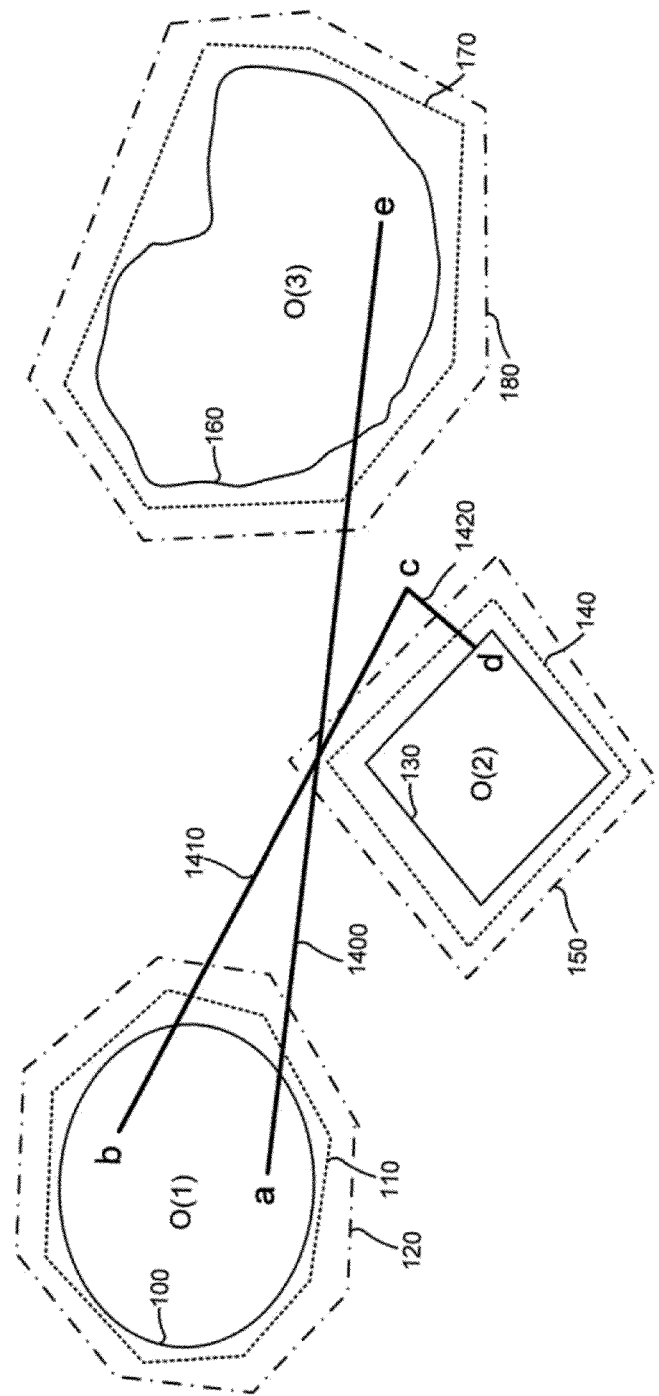
FIG. 14 illustrates a second example of a legal simple paths procedure that is more complex that the one shown in FIG. 12.

FIG. 14 illustrates a second example of a legal simple paths procedure that is more complex that the one shown in FIG. 12. As shown in FIG. 14, a first path 1400 between point a (within O(1)) and point e (within O(3)) is a legal path, and the simple paths module 545 returns a "true" or "valid" statement. Both point a and point e are floating ports. Similarly, a second path is made up of a first sub-path 1410 between point b (which is a floating port within O(1)) and point c (which is a floating port near O(2)) and second sub-path 1420 between point c and point d (which is a boundary port on the boundary of O(2)) is a legal path. The simple paths module 545 returns a "true" or "valid" statement in such cases as shown in FIG. 14.

Figure 15:
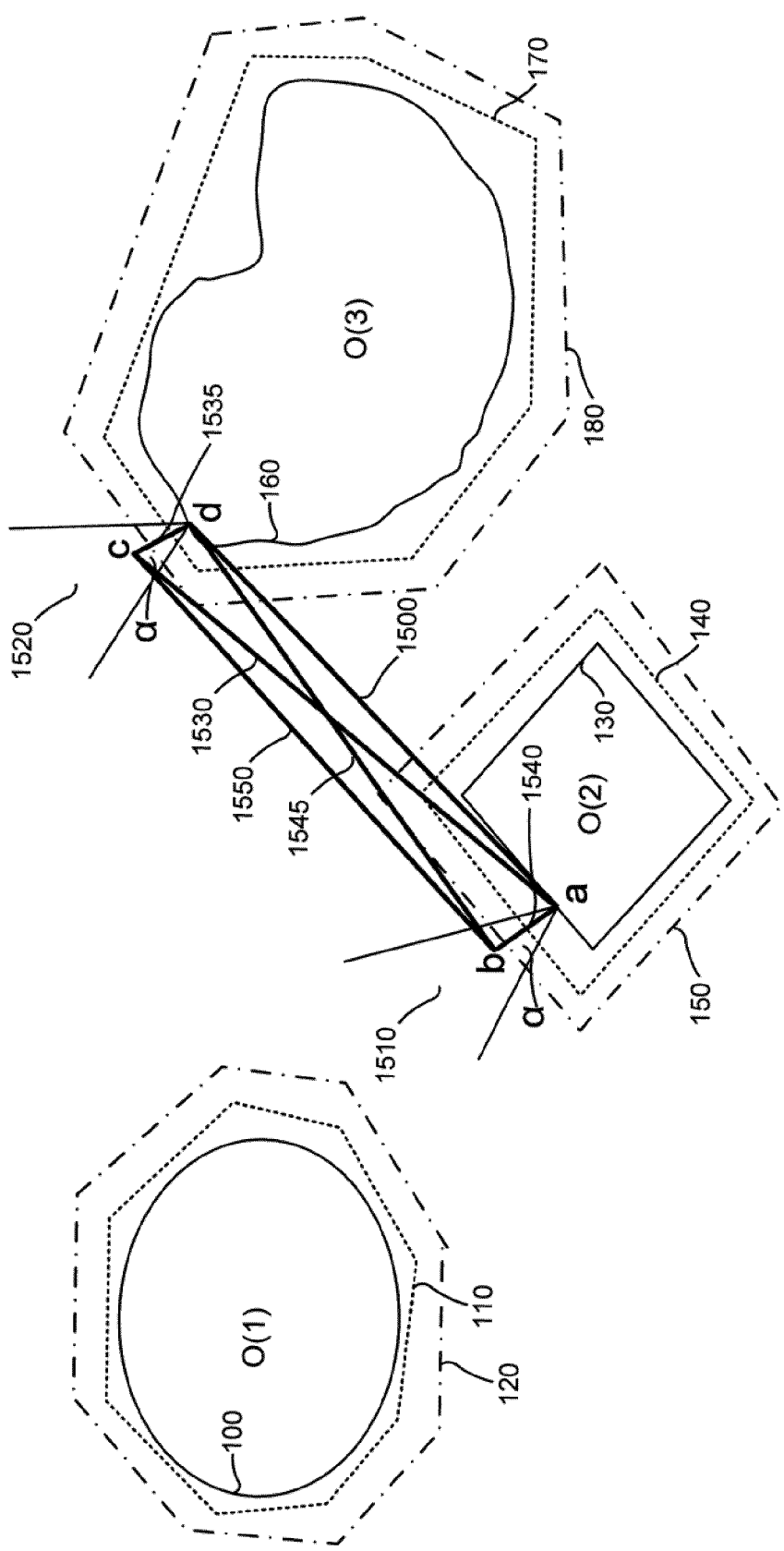
FIG. 15 illustrates an example of a more legal and illegal simple paths procedures that are more complex that the ones shown in FIGS. 12-14.

FIG. 15 illustrates an example of a more legal and illegal simple paths procedures that are more complex that the ones shown in FIGS. 12-14. As shown in FIG. 15, a first path 1500 between point a (a boundary port on the boundary of O(2)) and point d (a boundary port on the boundary of O(3)) is an illegal path. This first path 1500 is illegal because the end segments of a and d are not contained in first α-cone 1510 (corresponding to point a) and a second α-cone 1520 (corresponding to point d) around normal vectors to curves at port locations. In this case the simple paths module 545 returns a "false" or an "invalid" statement.

FIG. 15 also illustrates a second path [a,c,d] including a first sub-path 1530 [a,c] and a second sub-path 1535 [c,d]. This second path [a,c,d] is illegal since the end segments of a and c as well as C and d are not contained in the first α-cone 1510 and the second α-cone 1520 around normal vectors to curves at port locations. In this case the simple paths module 545 returns a "false" or an "invalid" statement.

FIG. 15 also illustrates a third path [a,b,d] including a third sub-path 1540 [a,b] and a fourth sub-path 1545 [b,d]. This third path [a,b,d] also is illegal since the end segments of a and b as well as b and d are not contained in the first α-cone 1510 and the second α-cone 1520 around normal vectors to curves at port locations. In this case the simple paths module 545 returns a falser or an "invalid" statement.

FIG. 15 illustrates a fourth path [a,b,c,d] including the third sub-path 1540 [a,b] a fifth sub-path 1550 [b,c], the second sub-path 1535 [c,d], and the first path 1500 [d,a]. This fourth path [a,b,c,d] is legal since the end segments of a and b, b and c, c and d, and d and a are contained in the first α-cone 1510 and the second α-cone 1520 around normal vectors to curves at port locations. In this case the simple paths module 545 returns a "true" or a "valid" statement.

IV.B.4. Tangent Visibility Graph Extension Module

Figure 16:
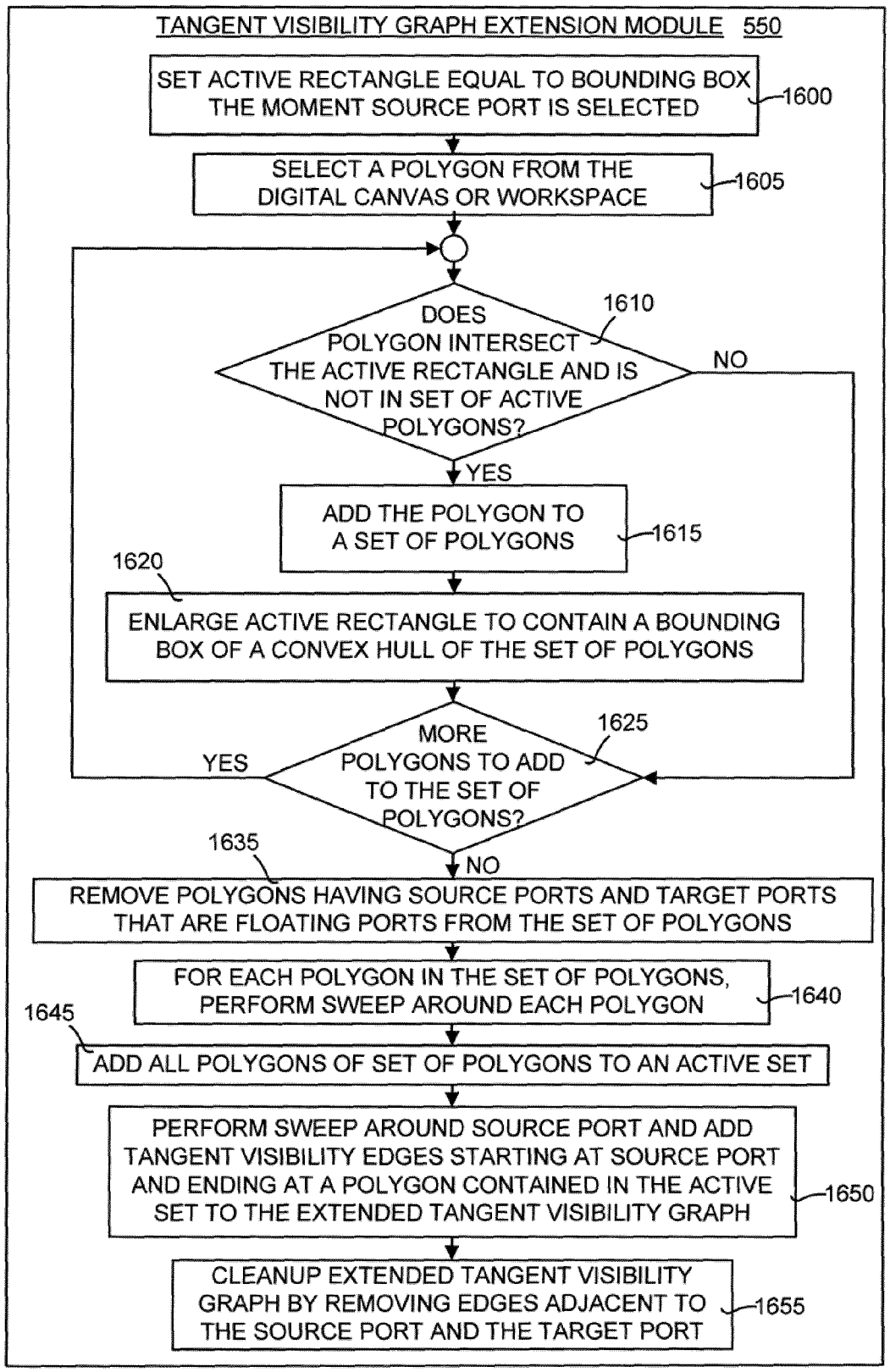
FIG. 16 is a detailed flow diagram illustrating the operation of embodiments of the tangent visibility graph extension module shown in FIG. 5.

Embodiments of the tangent visibility graph extension module 550 prepare a tangent visibility graph to be large enough to contain a shortest path between the source port and the target port of the connector being constructed. FIG. 16 is a detailed flow diagram illustrating the operation of embodiments of the tangent visibility graph extension module 550 shown in FIG. 5. The moment the source port is selected, the module 550 set the active rectangle, R, to be equal to the bounding box of $L^c$, where C is the curve of the source port (box 1600). Embodiments of the tangent visibility graph extension module 550 then are used to prepare the tangent visibility graph.

Embodiments of the tangent visibility graph extension module create an initially empty set of polygons LA and enlarge the active rectangle R to contain the target port of the connector. The module 550 then performs an iterative process to find polygons. Specifically, the module 550 selects a polygon from the digital canvas or workspace (box 1605). Next, polygons are found of L intersecting R that are not in an active set A. This is done by making a determination as to whether the polygon being considered intersects the active rectangle R and is not in a set of active polygons A (box 1610). If so, then the found polygon is added to the set of polygons LA, which is no longer an empty set (box 1615). Next, the active rectangle R is enlarged to contain the convex hull of LA (box 1620). This process is repeated as long as there are polygons to add to the set of polygons LA (box 1625). Otherwise the module 550 exits.

Next, a polygon $L^c$ having a source port that is a floating port of form F(c,p) is removed from the set of polygons LA (box 1635). Similarly, a polygon $L^c$ having a target port that is a floating port of form F(c,p) is removed from the set of polygons LA (box 1635).

For each polygon contained in the set of polygons LA, the module 550 performs a sweep around each polygon (box 1640). The module 550 then adds to the tangent visibility graph G all tangent visibility edges supporting the polygon and polygons of {LA–{p}} U A. Next, all polygons of LA are added to an active set A (box 1645). A sweep then is performed around the source port and tangent visibility edges are added starting at the source port and ending at a polygon contained in the active set A to the tangent visibility graph G (box 1650). Similarly, the module 550 performs a sweep around the target port and adds tangent visibility edges starting at the termination point and ending at a polygon contained in the active set A to the tangent visibility graph G (box 1650). The sweep around a polygon or a port to add edges adjacent to the port or to the shape to G is performed using a "Visibility Algorithms in Plane" procedure that is known to those having ordinary skill in the art. The module 550 also includes a cleanup technique that removes from the tangent visibility graph G all edges adjacent to the source port or the target port (box 1655).

It should be noted that the most computationally intensive step of embodiments of the interactive connector routing system 500 and method is when the module 550 performs a sweep around each polygon and adds to the tangent visibility graph G all tangent visibility edges supporting the polygon and polygons of {LA–{p}} U A. If n is the number of polygons in LA and m is the number of polygons in A, then this step executes in $O(n*(n+m)*\log(n+m))$ time. But recall that LA is the set of polygons that are "discovered" by the current mouse movement. Studies have suggested that when the zoom factor of the drawing is not too small, then n is usually less than 10. In practice, this step in practice does not take much time and is fast enough to provide good visual feedback.

IV.B.5. Shortest Path Creation Module

Figure 17:
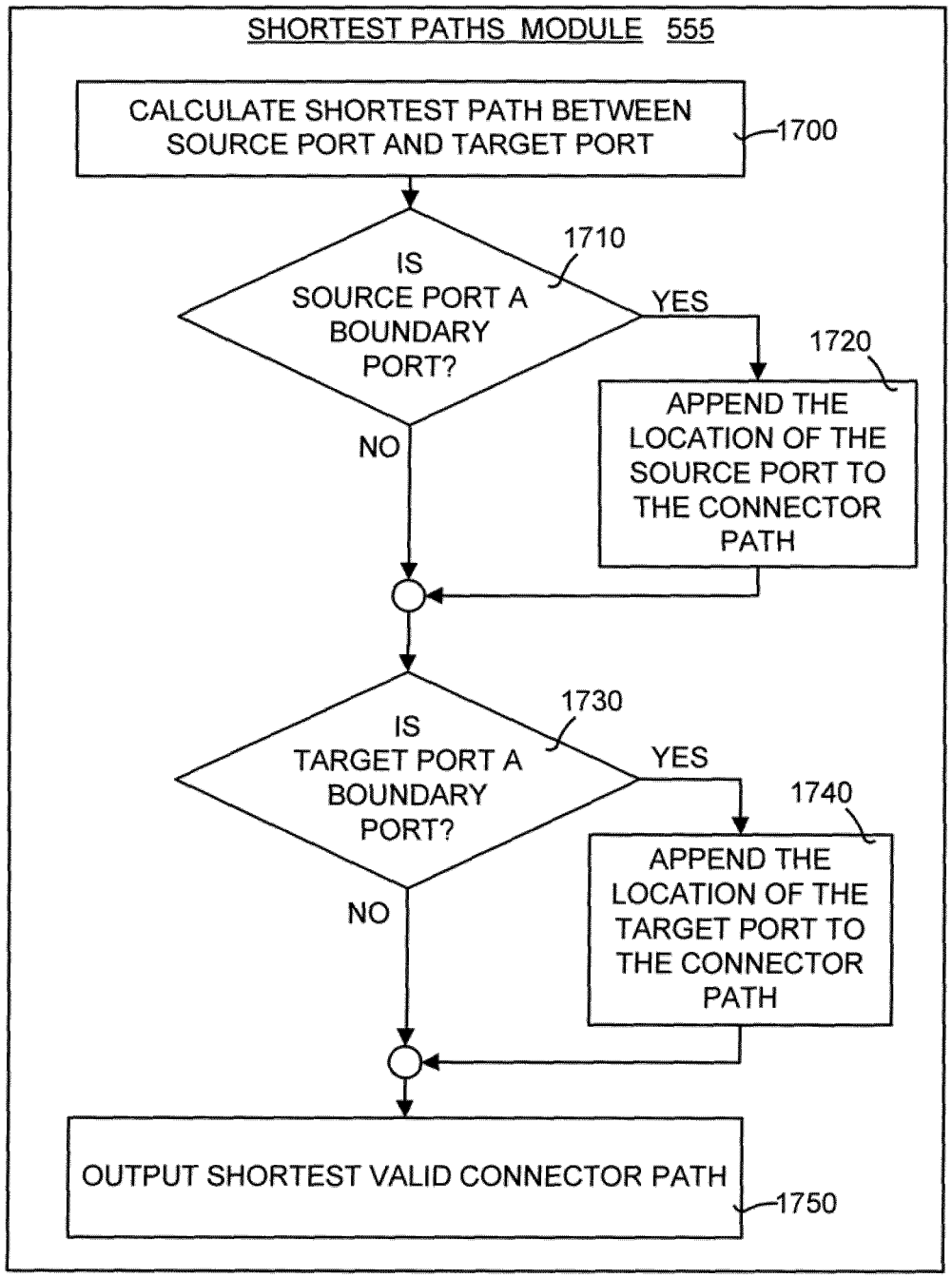
FIG. 17 is a detailed flow diagram illustrating the operation of embodiments of the shortest paths module shown in FIG. 5.

FIG. 17 is a detailed flow diagram illustrating the operation of embodiments of the shortest paths module 555 shown in FIG. 5. Embodiments of the shortest path creation module 555 begin by calculating a shortest path between the source port and the target port in the tangent visibility graph G (box 1700). In some embodiments this is achieved by applying a Dijkstra algorithm. A determination then is made as to whether the source port is a boundary port (box 1710). If so, then the module 555 appends the location of the source port to the path of the connector being created (box 1720).

Next, another determination is made as to whether the target port is a boundary port (box 1730). If so, then the module 555 appends the location of the target port to the path of the connector being created (box 1740). The module 555 then outputs the shortest valid path for the connector (box 1750).

IV.B.6 Finishing Module

Figure 18:
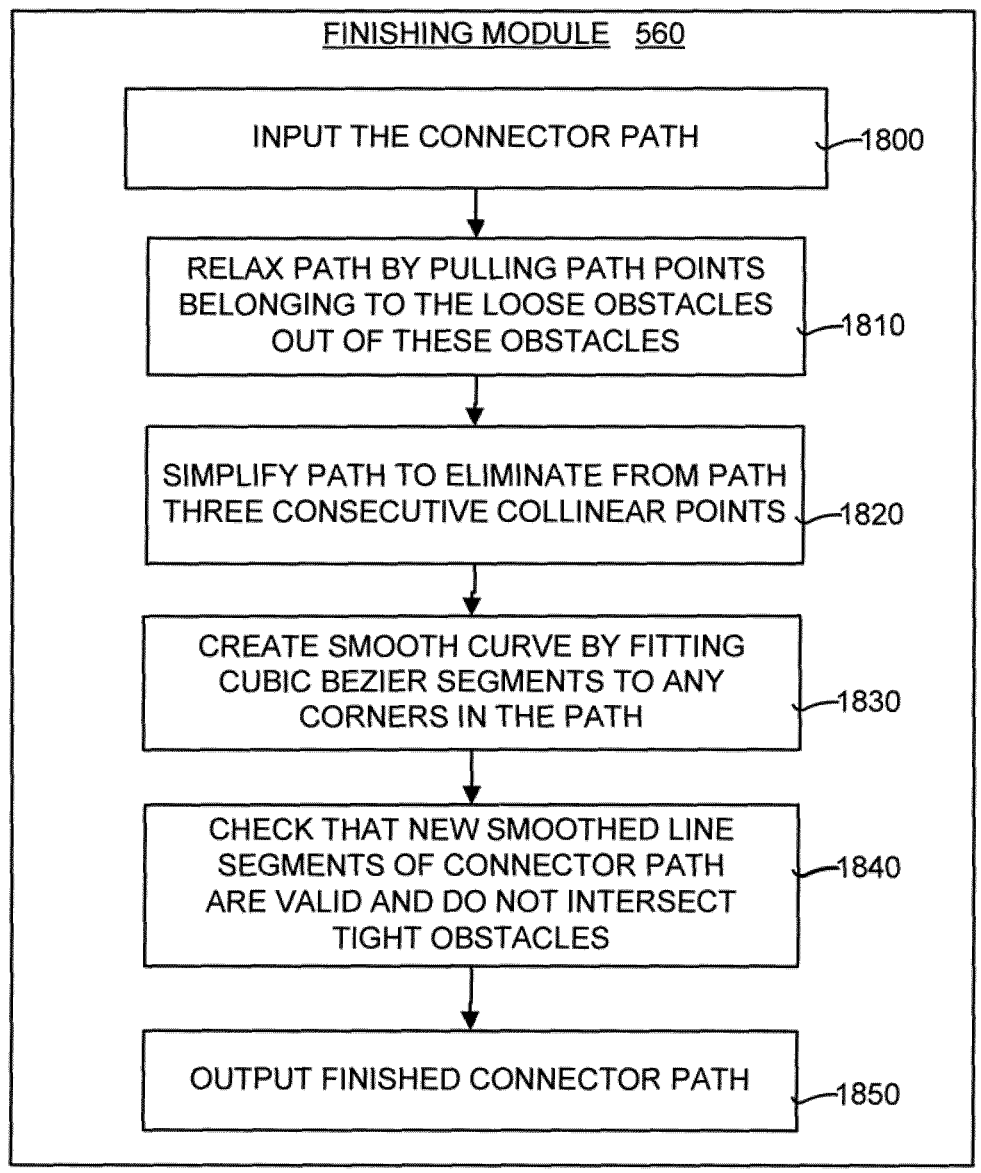
FIG. 18 is a detailed flow diagram illustrating the operation of embodiments of the shortest paths module shown in FIG. 5.

FIG. 18 is a detailed flow diagram illustrating the operation of embodiments of the shortest paths module 560 shown in FIG. 5. Embodiments of the finishing module 560 perform finishing touches on the connector to improve its appearance. The module 560 begins inputting the connector path (box 1800). Next, the module 560 relaxes the path of the connector by pulling its path points belonging to the loose obstacles out of these obstacles (box 1810). This serves to "beautify" the connector to make the connector more aesthetically pleasing. The module 560 then simplifies the connector path until the path does not have three consecutive collinear points (box 1820). Next, the module 560 creates a smooth curve by fitting cubic Bezier segments to any corner that are in the connector path (box 1830). The module 560 then checks that the new smoothed segments of the connector path do not intersect the tight obstacles T (box 1840). Finally, the module 560 outputs the finished connector path (box 1850).

V. Exemplary Operating Environment

Embodiments of the interactive connector routing system 500 and method are designed to operate in a computing environment. The following discussion is intended to provide a brief, general description of a suitable computing environment in which embodiments of the interactive connector routing system 500 and method may be implemented.

Figure 19:
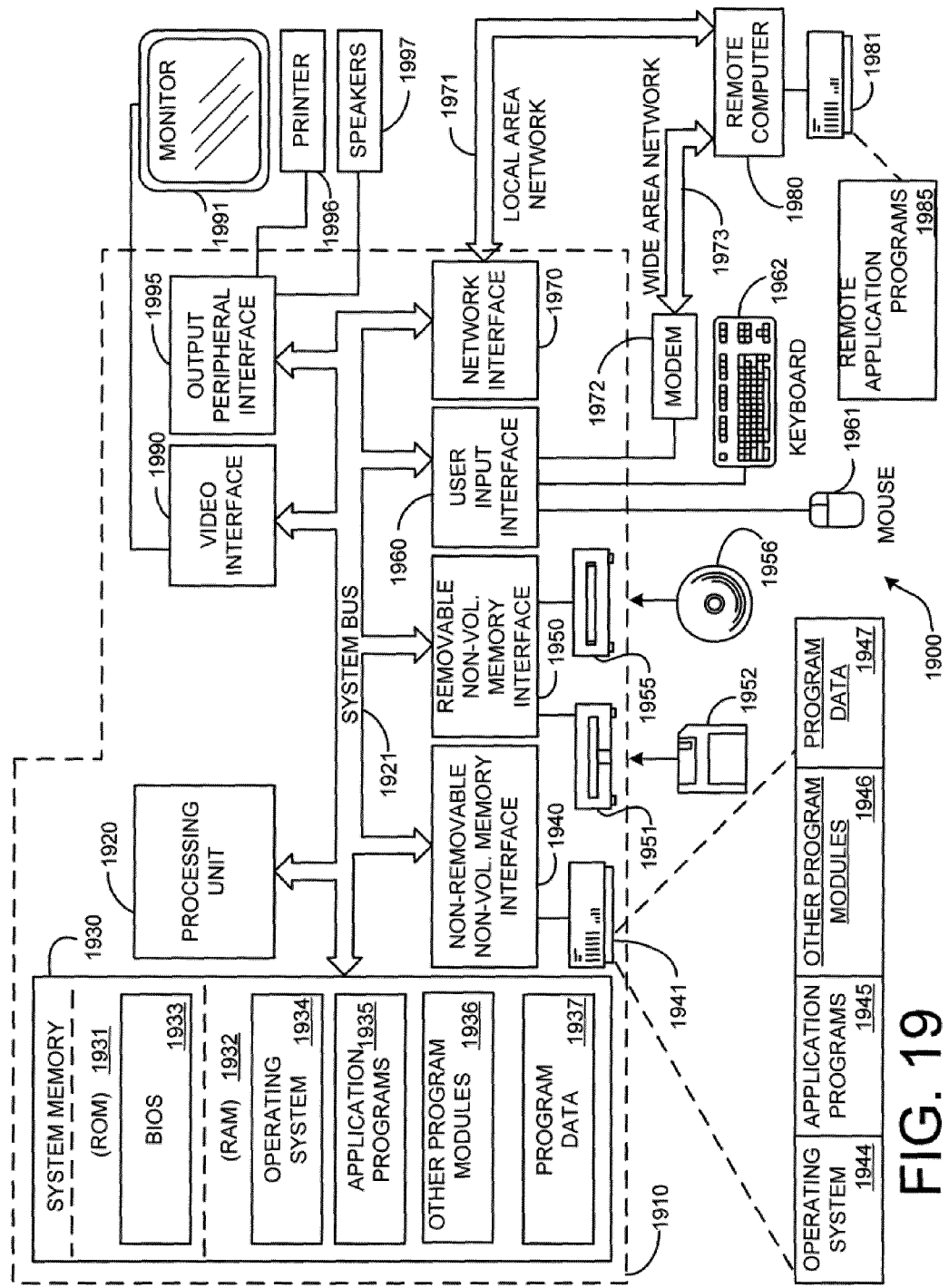
FIG. 19 illustrates an example of a suitable computing system environment in which embodiments of the interactive connector routing system and method shown in FIGS. 5-18 may be implemented.

FIG. 19 illustrates an example of a suitable computing system environment in which embodiments of the interactive connector routing system 500 and method shown in FIGS. 5-18 may be implemented. The computing system environment 1900 is one example of a suitable computing environment and is not intended to suggest any limitation as to the scope of use or functionality of the invention. Neither should the computing environment 1900 be interpreted as having any dependency or requirement relating to any one or combination of components illustrated in the exemplary operating environment.

Embodiments of the interactive connector routing system 500 and method are operational with numerous other general purpose or special purpose computing system environments or configurations. Examples of well known computing systems, environments, and/or configurations that may be suitable for use with embodiments of the interactive connector routing system 500 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the interactive connector routing system 500 and method may be described in the general context of computer-executable instructions, such as program modules, being executed by a computer. Generally, program modules include routines, programs, objects, components, data structures, etc., that perform particular tasks or implement particular abstract data types. Embodiments of the interactive connector routing system 500 and method may also be practiced in distributed computing environments where tasks are performed by remote processing devices that are linked through a communications network. In a distributed computing environments program modules may be located in both local and remote computer storage media including memory storage devices. With reference to FIG. 19, an exemplary system for the interactive connector routing system 500 and method includes a general-purpose computing device in the form of a computer 1910.

Components of the computer 1910 may include, but are not limited to, a processing unit 1920 (such as a central processing unit, CPU), a system memory 1930, and a system bus 1921 that couples various system components including the system memory to the processing unit 1920. The system bus 1921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1910 typically includes a variety of computer readable media. Computer readable media can be any available media that can be accessed by the computer 1910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CO-ROM, digital versatile disks (DVD) or other optical disk storage, magnetic cassettes, magnetic tape, magnetic disk storage or other magnetic storage devices, or any other medium which can be used to store the desired information and which can be accessed by the computer 1910. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1930 includes computer storage media in the form of volatile and/or nonvolatile memory such as read only memory (ROM) 1931 and random access memory (RAM) 1932. A basic input/output system 1933 (BIOS), containing the basic routines that help to transfer information between elements within the computer 1910, such as during start-up, is typically stored in ROM 1931. RAM 1932 typically contains data and/or program modules that are immediately accessible to and/or presently being operated on by processing unit 1920. By way of example, and not limitation, FIG. 19 illustrates operating system 1934, application programs 1935, other program modules 1936, and program data 1937.

The computer 1910 may also include other removable/non-removable, volatile/nonvolatile computer storage media. By way of example, FIG. 19 illustrates a hard disk drive 1941 that reads from or writes to non-removable, nonvolatile magnetic media, a magnetic disk drive 1951 that reads from or writes to a removable, nonvolatile magnetic disk 1952, and an optical disk drive 1955 that reads from or writes to a removable, nonvolatile optical disk 1956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1941 is typically connected to the system bus 1921 through a non-removable memory interface such as interface 1940, and magnetic disk drive 1951 and optical disk drive 1955 are typically connected to the system bus 1921 by a removable memory interface, such as interface 1950.

The drives and their associated computer storage media discussed above and illustrated in FIG. 19, provide storage of computer readable instructions, data structures, program modules and other data for the computer 1910. In FIG. 19, for example, hard disk drive 1941 is illustrated as storing operating system 1944, application programs 1945, other program modules 1946, and program data 1947. Note that these components can either be the same as or different from operating system 1934, application programs 1935, other program modules 1936, and program data 1937. Operating system 1944, application programs 1945, other program modules 1946, and program data 1947 are given different numbers here to illustrate that, at a minimum, they are different copies. A user may enter commands and information (or data) into the computer 1910 through input devices such as a keyboard 1962, pointing device 1961, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1920 through a user input interface 1960 that is coupled to the system bus 1921, but may be connected by other interface and bus structures, such as, for example, a parallel port, game port or a universal serial bus (USB). A monitor 1991 or other type of display device is also connected to the system bus 1921 via an interface, such as a video interface 1990. In addition to the monitor, computers may also include other peripheral output devices such as speakers 1997 and printer 1996, which may be connected through an output peripheral interface 1995.

The computer 1910 may operate in a networked environment using logical connections to one or more remote computers, such as a remote computer 1980. The remote computer 1980 may be a personal computer, a server, a router, a network PC, a peer device or other common network node, and typically includes many or all of the elements described above relative to the computer 1910, although only a memory storage device 1981 has been illustrated in FIG. 19. The logical connections depicted in FIG. 19 include a local area network (LAN) 1971 and a wide area network (WAN) 1973, but may also include other networks. Such networking environments are commonplace in offices, enterprise-wide computer networks, intranets and the Internet.

When used in a LAN networking environment, the computer 1910 is connected to the LAN 1971 through a network interface or adapter 1970. When used in a WAN networking environment, the computer 1910 typically includes a modem 1972 or other means for establishing communications over the WAN 1973, such as the Internet. The modem 1972, which may be internal or external, may be connected to the system bus 1921 via the user input interface 1960, or other appropriate mechanism, in a networked environment, program modules depicted relative to the computer 1910, or portions thereof, may be stored in the remote memory storage device. By way of example, and not limitation, FIG. 19 illustrates remote application programs 1985 as residing on memory device 1981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for generating a connector joining two shapes in a digital canvas, the computer-implemented method comprising:
    using the computing device to perform the following:
        selecting the two shapes from the digital canvas;
        performing an initialization process for generating the connector responsive to a user dragging a pointing device that is in communication with the computing device;
        as the pointing device is moved to different positions:
            enlarging an active discovery region based on the different positions where the pointing device is moved,
            using the enlarged active discovery region to build an extended visibility graph,
            creating different portions of the connector using the extended visibility graph, and
            providing visual feedback to the user as the different portions of the connector are created; and
        connecting the two shapes using the connector such that other shapes in the digital canvas are avoided by the connector.

2. The computer-implemented method of claim 1, wherein the extended visibility graph is a tangent visibility graph and the active discovery region is rectangular.

3. The computer-implemented method of claim 2, further comprising:
    designating a first of the two shapes as a source shape, the connector starting at the first shape; and
    designating a second of the two shapes as a target shape, the connector terminating at the second shape.

4. The computer-implemented method of claim 3, further comprising:
    creating a set of tight obstacles around the other shapes, and
    avoiding the set of tight obstacles when creating the different portions of the connector.

5. The computer-implemented method of claim 4, further comprising computing a shortest path between the source shape and the target shape as a series of line segments that do not intersect the set of tight obstacles around the other shapes in the digital canvas.

6. The computer-implemented method of claim 5, further comprising:
    obtaining, from the pointing device, a source location for a source port, the source port being where the connector begins;
    determining whether the source location is on or near a boundary of the source shape;
    when the source location is on or near the boundary of the source shape, then creating the source port at the boundary of the source shape and designating the source port as a boundary port; and
    when the source location is not on or near the boundary of the source shape, then creating the source port at the source location on the source shape and designating the source port as a floating port.

7. The computer-implemented method of claim 6, further comprising:
    obtaining, from the pointing device, a target location for a target port, the target port being where the connector terminates;
    determining whether the target location is on or near a boundary of the target shape;
    when the target location is on or near the boundary of the target shape, then creating the target port at the boundary of the target shape and designating the target port as a boundary port; and
    when the target location is not on or near the boundary of the target shape, then creating the target port at the target location on the target shape and designating the target port as a floating port.

8. A computing device comprising:
    a processing unit; and
    one or more computer storage media comprising computer readable instructions which, when executed by the processing unit, cause the processing unit to:
        identify a source shape in a digital canvas based on movement of a pointing device that is in communication with the computing device;
        as the pointing device is moved to different positions:
            enlarge an active discovery region based on the different positions where the pointing device is moved,
            use the enlarged active discovery region to build an extended visibility graph,
            create different portions of a connector using the extended visibility graph, and
            provide visual feedback as the different portions of the connector are created; and
        connect the source shape to a target shape using the connector such that other shapes in the digital canvas are avoided by the connector.

9. The computing device of claim 8, wherein the extended visibility graph is a tangent visibility graph.

10. The computing device of claim 9, wherein the active discovery region is a polygon and the enlarged active discovery region is a larger polygon.

11. The computing device of claim 9, wherein the active discovery region is a rectangle and the enlarged active discovery region is a larger rectangle.

12. The computing device of claim 11, wherein the computer readable instructions further cause the processing unit to:
    compute the connector as a shortest path in the tangent visibility graph between a source port on the source shape and a target port on the target shape.

13. The computing device of claim 12, wherein the computer readable instructions further cause the processing unit to:

relax the connector by pulling points of the connector belonging to loose obstacles out of the loose obstacles.

14. The computing device of claim 13, wherein the computer readable instructions further cause the processing unit to:
simplify the connector so that the connector does not have three consecutive collinear points.

15. The computing device of claim 14, wherein the computer readable instructions further cause the processing unit to:
smooth the connector by fitting segments to one or more corners of the connector.

16. The computing device of claim 15, wherein the segments are cubic Bezier segments.

17. One or more computer-readable memory devices or storage devices comprising computer readable instructions which, when executed by a computing device, cause the computing device to perform acts comprising:
identify a source port on a source shape in a digital canvas or workplace, the source port being identified based on movement of a pointing device that is in communication with the computing device;
as the pointing device is moved to different positions on the digital canvas or workplace:
enlarging an active discovery region based on the different positions where the pointing device is moved,
building an extended visibility graph using the enlarged active discovery region,
creating different portions of a connector using the extended visibility graph, and
providing visual feedback as the different portions of the connector are created; and
connecting the source port to a target port on a target shape using the connector such that other shapes in the digital canvas or workplace are avoided by the connector.

18. The one or more computer-readable memory devices or storage devices of claim 17, wherein the visual feedback is provided in real time.

19. The one or more computer-readable memory devices or storage devices of claim 17, wherein the different portions are created for each pointing device event that occurs when the pointing device is being moved to the different positions.

20. The one or more computer-readable memory devices or storage devices of claim 17, further comprising determining the different positions while the pointing device is being dragged on the digital canvas or workplace.

* * * * *